(12) United States Patent
Columbus et al.

(10) Patent No.: US 7,546,263 B2
(45) Date of Patent: Jun. 9, 2009

(54) SYSTEM, METHOD AND COMPUTER READABLE MEDIUM CONTAINING INSTRUCTIONS FOR EVALUATING AND DISSEMINATING SECURITIES ANALYST PERFORMANCE INFORMATION

(75) Inventors: Craig E. Columbus, Scottsdale, AZ (US); J. Carr Bettis, Scottsdale, AZ (US)

(73) Assignee: Thomson Holdings LLC, New York, NY (US)

( * ) Notice: Subject to any disclaimer, the term of this patent is extended or adjusted under 35 U.S.C. 154(b) by 1733 days.

(21) Appl. No.: 09/829,439

(22) Filed: Apr. 10, 2001

(65) Prior Publication Data
US 2002/0022988 A1 Feb. 21, 2002

Related U.S. Application Data

(63) Continuation-in-part of application No. 09/597,742, filed on Jun. 19, 2000.

(60) Provisional application No. 60/196,314, filed on Apr. 12, 2000, provisional application No. 60/139,771, filed on Jun. 18, 1999.

(51) Int. Cl.
G06Q 40/00 (2006.01)
(52) U.S. Cl. .................. 705/36 R; 705/11
(58) Field of Classification Search .......... 705/35, 705/36 R, 11
See application file for complete search history.

(56) References Cited

U.S. PATENT DOCUMENTS 4,566,066 A 1/1986 Towers
5,132,899 A 7/1992 Fox
5,163,131 A 11/1992 Row et al.
5,761,442 A 6/1998 Barr et al.
5,812,987 A 9/1998 Luskin et al.
6,510,419 B1 * 1/2003 Gatto ..................... 705/36 R

FOREIGN PATENT DOCUMENTS

WO WO 99/56192 11/1999

OTHER PUBLICATIONS

Gitlin, R.D., J.F. Hayes and S.B. Weinstain. *Data Communications Principles*. Weinstain, Plenum Press, 1992.
Green, James Harry. *The Irwin Handbook of Telecommunications*. Irwin Professional Publishing, 2nd ed., 1992.

(Continued)

*Primary Examiner*—Alexander Kalinowski
*Assistant Examiner*—Dan Kesack
(74) *Attorney, Agent, or Firm*—Irah H. Donner; Wilmer Cutler Pickering Hale and Dorr LLP

(57) ABSTRACT

An analyst's performance is evaluated by utilizing information pertaining to at least one revision issued by the analyst involving at least one investment. This evaluation includes determining a conditional performance score indicative of the analyst's performance relative to other investors. The performance score is determined at least in part by considering an average historical performance of the investment, following the revision. In addition, the performance score is also determined using a historical consistency of the analyst's performances with respect to revisions involving the investment, and a number of revisions made by the analyst. Then, the performance score may be adjusted according to one or more adjustments, including adjustments for accentuating a number of issued revisions and a return amount, to generate a final performance score.

44 Claims, 23 Drawing Sheets

OTHER PUBLICATIONS

Stallings, William. *Computer Organization and Architecture*. MacMillan Publising Co., 3rd ed., 1993.

Spohn, Darren L. *Data Network Design*. McGraw-Hill, Inc., 1993.

Boxer, A. "Where Buses Cannot Go." *IEEE Spectrum*, Feb. 1995, pp. 41-45.

Barroso, L.A. et al. "RPM: A Rapid Prototyping Engine for Multiprocessor Systems." *IEEE Computer*, Feb. 1995, pp. 26-34.

* cited by examiner

DOW 30 - DAILY ANALYST SENTIMENT FOR 02/26/01

ROWS 1-30 OF 30

NOTES: 1) Click on the blue column header for a definition/explanation of the table column.
2) Click here for tips on how to use this report.
3) Significant activity is highlited in bold.

| Analyst Sent. | Ins. Sent | Ticker | Company | Proven Analyst Score | Range | Experience | Estimate Change | Proximity | Dispersion | Previous Analyst Sent. |
|---|---|---|---|---|---|---|---|---|---|---|
| -2 | 0 | AA | ALCOA INC | | NA | NO | NO | YES | NO | -3 |
| +2 | -1 | AXP | AMERICAN EXPRESS CO | 53 | NO | NO | NO | YES | NO | 0 |
| +2 | -2 | BA | BOEING CO | | YES | NO | NO | NA | NA | +2 |
| 0 | 0 | C | CITIGROUP INC | | NO | NO | YES | NA | NA | +2 |
| 0 | NT | CAT | CATERPILLAR INC | 32 | NO | NO | YES | YES | NO | 0 |
| 0 | NT | DD | DUPONT E I DE NEMOURS & CO | | NA | NO | NO | YES | NO | -3 |
| -3 | 0 | DIS | DISNEY WALT HLDG CO | 65 | NA | NO | NO | YES | NO | NR |
| NR | -1 | EK | EASTMAN KODAK CO | | NO | NO | NO | YES | NO | -3 |
| 0 | -2 | GE | GENERAL ELEC CO | 62 | NA | NO | YES | NA | YES | -3 |
| -3 | -2 | GM | GENERAL MTRS CORP | | NA | NO | NO | NA | YES | +2 |
| +1 | -3 | HD | HOME DEPOT INC | 49 | NA | NO | NO | NO | NO | -1 |
| -1 | -1 | HON | HONEYWELL INT'L INC | | NO | NO | NO | YES | NO | 0 |
| 0 | 0 | HWP | HEWLETT PACKARD CO | | NO | NO | NO | YES | NO | 0 |
| 0 | 0 | IBM | INTERNATIONAL BUSINESS MACHS | 81 | NA | YES | NO | YES | NO | +3 |
| -3 | 0 | INTC | INTEL CORP | 75 | NO | YES | NO | NO | NO | -3 |
| 0 | NT | IP | INTERNATIONAL PAPER CO | | YES | YES | NO | NO | NO | 0 |
| +3 | -1 | JNJ | JOHNSON & JOHNSON | | NA | NO | NO | NA | NA | +3 |

FIG. 5a

NASDAQ
IT'S TAX TIME!

Home | Quotes | Ticker | News | Market Activity | Global Markets | IPOs | Holdings/ Insiders | Extended Trading | Investor Tools | Personal Finance | Exchange Traded Funds | Nasdaq Store 3/22/2001 Market Closed | Nasdaq 1897.70 67.47 ▲ +3.69% | DJIA 9389.48 97.52 ▼ -1.03% | S&P 1117.58 4.56 ▼ -0.41%

InfoQuotes
Flash Quotes
Symbol Look-Up
Add a Security
[  ] Go

<plug power    Analyst Info LMNX PLUG
                Plug Power, Inc. Nasdaq-NM

| Company News | Fund- amentals | Stock Chart | Analyst Info | Holdings/ Insiders | Stock Report | Real-Time Filings | Equity Options | Extended Trading |

Summary | Recommendations | EPS | Earnings Surprise | Forecast | Momentum | P/E Ratio | Earnings Growth | P/E & Growth Rates | PEG RATIO    530

Click here to ▽
Ameritrade®

| Consensus Recommendation | Detailed Analyst Recommendation |
|---|---|
| Sell ⟵⟶ Strong Buy | Strong Buy 2<br>Buy 2<br>Hold 8<br>Underperform 0<br>Sell 0     View list of Analyst Firms |

Each recommendation received from contributors is mapped to one of the I/B/E/S standard ratings. A consensus recommendation is determined by an average of the numeric values, rounding that mean value to the nearest integer.

| 12 Month Price Target Range | Earnings Surprise |
|---|---|
| Consensus<br>22  30  33.5<br>14<br>Previous Close  Graph Key<br>Price targets are calculated by estimating future earnings per share and then applying a price-to earnings multiple, known as the P/E ratio. | n/a  n/a<br>-0.13<br>-0.27<br>-0.41<br>-0.55<br>Sep99 Dec99 Mar00 Jun00 Sep00 Dec00<br>☐ Estimate ☐ Reported Earning<br>View earnings surprise data table for more information. |

532
534

| Momentum (4 Weeks) Quarter End & Fiscal | Detailed Estimates Submitted |
|---|---|
| ▷ 12/2001 1 of 12 estimates changed<br>Up: 1<br>Down: 0<br>▷ 12/2001 EPS Mean % change -1.981%<br>-2.019 [    ] 1 Month Ago<br>-1.979 [    ] Current<br>Estimate momentum measures changes in analyst sentiment over time and may be an indicator of future price movements. | -1.18<br>-1.38<br>-1.58<br>-1.78<br>-1.98<br>-2.18<br>-2.38<br>-136  -102  -68  -34  0<br># of Days<br>— Consensus Estimate  ◇ Initial Estimate  Graph Key<br>△ Revision Up  ▽ Revision Down |

| Earnings Growth | Price/Earnings  EPS Summary |
|---|---|
| PLUG  n/a %<br>Industry [    ] 71.25% | PLUG  NE<br>Industry [    ] 22.11 |

536

| Estimate Growth is the measure of year on year earnings per share (EPS) growth form the prior fiscal year, expressed as a percentage. View Forecast Earnings Growth. | Price/Earnings ratio is a widely used stock evaluation measure. View P/E data for the next four years for this security.. |
|---|---|
| Consensus Earnings Forecasts | PEG Ratio |

FIG. 5c

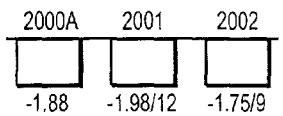

Insufficient information to display the graph for this symbol.

The actual reported earnings per share for 12/2000 for PLUG was -1.88. For the fiscal year 12/2001, the consensus mean EPS is -1.98, derived from a total of 12 estimates.

View annual and quarterly consensus data.

Home | About Nasdaq | Feedback | Help & Reference
Equity & Index Options | Site Map, Index, Search Source: *Thomson Financial I/B/E/S* Updated Daily.

NASDAQ

FIG. 5d

| TICKER | COMPANY NAME | ANALYST NAME | PASU | PASD | avg_1_week_ret_up | avg_1_month_ret_up | avg_3_month_ret_up |
|---|---|---|---|---|---|---|---|
| IBM | IBM | J SMITH | 99 | 71 | 0.034899566 | 0.090886384 | 0.117523476 |
| IBM | IBM | L SMITH | 92 | 61 | 0.015673233 | 0.138761967 | 0.228434235 |
| IBM | IBM | H SMITH | 80 | 80 | 0.003553083 | 0.025101786 | 0.063786447 |
| IBM | IBM | I SMITH | 73 | 40 | 0.051533949 | -0.003668944 | 0.140866771 |
| IBM | IBM | D SMITH | 72 | 13 | -0.004881856 | 0.096308127 | 0.121678516 |
| IBM | IBM | O SMITH | 69 | 16 | 0.008708663 | -0.009696909 | 0.130696982 |

PASU = PROVEN ANALYST SCORE UP
PASD = PROVEN ANALYST SCORE DOWN

FIG. 18a

| avg_1_week_ret_down | avg_1_month_ret_down | avg_3_month_ret_down | sd_1_week_up | sd_1_month_up | sd_3_month_up |
|---|---|---|---|---|---|
| -0.002522911 | -0.041396424 | -0.007745342 | 0.059827294 | 0.120845422 | 0.119219318 |
| -0.047319114 | -0.032607917 | 0.032090358 | 0.005992425 | 0.006019168 | 0.025150739 |
| -0.006521728 | -0.013781323 | -0.009922532 | 0.040382113 | 0.074623019 | 0.141585141 |
| -0.000147587 | 0.054049157 | 0.033326894 | 0.025394157 | 0.052356202 | 0.083870798 |
| 0.053901546 | 0.103812635 | 0.130158335 | 0.034487598 | 0.058855474 | 0.032466203 |
| 0.010676419 | 0.025612677 | 0.159289882 | 0.026967889 | 0.086870186 | 0.1662893 |

FIG. 18b

| sd_1_week_down | sd_1_month_down | sd_3_month_down | num_1_week_rev_up | num_1_month_rev_up | num_3_month_rev_up |
|---|---|---|---|---|---|
| 0.016802499 | 0.033487085 | 0.087888792 | 11 | 11 | 11 |
| 0.058471531 | 0.026412129 | 0.150686339 | 2 | 2 | 2 |
| 0.026006684 | 0.085535757 | 0.152431682 | 23 | 22 | 22 |
| 0.059823409 | 0.128282651 | 0.130589873 | 3 | 3 | 3 |
| 0.035317507 | 0.100265294 | 0.09392596 | 4 | 4 | 4 |
| 0.029608766 | 0.08500158 | 0.125550747 | 9 | 9 | 9 |

FIG. 18c

| num_1_week_rev_down | num_1_month_rev_down | num_3_month_rev_down | RAWU | RAWD |
|---|---|---|---|---|
| 5 | 5 | 5 | 90.63125424 | 54.98876132 |
| 2 | 2 | 2 | 83.82913296 | 41.15271567 |
| 28 | 28 | 27 | 74.13946079 | 65.93335914 |
| 9 | 9 | 8 | 67.71210562 | 11.56466167 |
| 4 | 4 | 4 | 67.48069929 | -24.66616455 |
| 15 | 15 | 15 | 64.47702929 | -19.92557515 |

FIG. 18d

SYSTEM, METHOD AND COMPUTER READABLE MEDIUM CONTAINING INSTRUCTIONS FOR EVALUATING AND DISSEMINATING SECURITIES ANALYST PERFORMANCE INFORMATION

RELATED APPLICATIONS

This application is a continuation-in-part of U.S. patent application Ser. No. 09/597,742, filed Jun. 19, 2000, to Bettis et al., which claims priority from U.S. Provisional Application No. 60/139,771, filed Jun. 18, 1999, both of which are incorporated herein by reference. This application also claims priority from U.S. Provisional Application No. 60/196,314, filed Apr. 12, 2000, to Columbus et al., which is also incorporated herein by reference.

TECHNICAL FIELD

The present invention relates generally to analyzing performance of investment professionals, and more particularly, to a system, method, and computer readable medium storing computer-executable instructions for evaluating the performance of securities analysts, investment analysts and/or other investment related individuals and/or entities.

BACKGROUND ART

In the context of securities and other types of investments, obtaining the advice of analysts has always been considered a prudent exercise. These analysts possess expertise in evaluating investments, such as securities, mutual funds, bonds, and the like. Most specialize in specific industries or sectors to allow for more in-depth research. During the course of providing investment advice, each analyst may make any number of upward and/or downward forecast revisions on securities in their area of expertise. These forecast revisions, or simply revisions, are changes in opinion on how much a company is likely to earn per share.

When these analysts speak, institutional as well as individual investors listen, driving stock prices sharply up or down depending on the nature of the analysts' latest pronouncements. As can be imagined, some analysts are more influential than others. For instance, some analysts, affectionately named 'axes', are so accurate that their comments carry disproportionate weight. While none are infallible, it is important to at least know and consider what professional analysts have to say about a particular stock of interest. With access to this information, users can make their own assessments and invest accordingly. Accordingly, we have determined that a need exists for efficiently disseminating such analyst information to the public. A need also exists for a system, method, and computer readable medium containing instructions utilizable for providing not only information concerning or considering an analyst's revisions, but also information pertaining to the reliability and/or accuracy of the revisions.

Several prior art techniques have not adequately addressed these needs. For example, U.S. Pat. No. 5,132,899 to Fox discloses a stock and cash portfolio development system. As depicted in prior art FIG. 1 of the present invention (FIG. 1 of Fox), the system of Fox uses data gathering and processing methodology to produce a system where a list of stocks and a cash position is generated and purchased for investment and operating accounts. Specifically, the system integrates three areas of data: investment performance for investment managers; Federal Securities and Exchange Commission reports filed quarterly by investment managers; and financial characteristics for a number of stocks, to produce a stock portfolio. For example, in box 1, investment managers are screened to produce a subset for analysis. From there, managers are selected (box 2) and sorted into descending order simply according to rates of return on investments (box 3). Subsequently, a consultant reviews the results (box 4) and prints the top five mangers (box 5).

Similarly, U.S. Pat. No. 4,566,066 to Towers relates to a securities valuation system. As shown in prior art FIG. 2 of the present application (FIG. 1 of Towers), the system of Towers, comprised of components 10-23, produces securities portfolio valuation schedules for multiple simultaneous users. In Towers, a customer communicates with the system through terminal 10 to access and edit accounts in user file 12. By using a CUSIP routine 18 and an AMOUNT routine to reflect stock splits and dividends since the last stock pricing, the system of Towers produces and displays 23 a selected stock portfolio valuation.

In U.S. Pat. No. 5,812,987 to Luskin et al., an investment fund management system manages assets in one or more investment funds over a specified period of time. This system, comprised of components 31-39, determines a strategic investment mix of assets in a particular fund periodically as a function of changing risk. Each fund is managed by manipulating the investment mix of the fund in accordance with criteria related to a diminishing length of time to a horizon where cash will be withdrawn therefrom. In prior art FIG. 3 of the present invention (FIG. 6 of Luskin et al.), the investment mix is adjusted by first obtaining investor portfolio information 35 and market data 36. This data is used to forecast market risks and returns 37, and to determine the portfolio risk 38. Then, the anticipated cash flow stream 39, the discount function 34, and present value of future cash flow 33 are calculated before producing an optimized portfolio 32 of assets.

In U.S. Pat. No. 5,761,442 to Barr et al., a data processing system selects securities and constructs an investment portfolio based on a set of artificial neural networks (prior art FIG. 4 of the present application, FIG. 2 of Barr et al.). The system comprises components 41-70 and is designed to model and track the performance of each security in a given capital market and output a parameter which is related to the expected risk adjusted return for the security. Each artificial neural network is trained using a number of fundamental and price and volume history input parameters 10, 20, 30 about the security and the underlying index. The system combines the expected return/appreciation potential data 50 for each security via an optimization process 60 to construct an investment portfolio which satisfies aggregate statistics. The data processing system receives input from the capital market and periodically evaluates the performance of the investment portfolio, rebalancing whenever necessary to correct performance degradations 70.

However while many of these prior art references disclose adequate methods of managing investment funds and portfolios, none make any mention of evaluating an analyst's or other investment trader's performance. Hence, what is lacking in the prior art is a technique directed not only toward an investment fund, but rather a technique for evaluating analysts and other traders or investment professionals/advisors based on their influence and accuracy. Accordingly, a need exists for a system, method, and computer readable medium containing instructions utilizable for not only disseminating information concerning an analyst's trader's actions, but also for evaluating the analyst's or trader's performance.

In line with the above, a need exists for a system, method, and computer readable medium containing instructions utilizable not only for providing raw information and data but also for evaluating performance based on returns observed after a particular revision, historical consistency, and/or the number of revisions made by the analyst or investing entity.

Furthermore, a need exists for a system, method, and computer readable medium containing instructions utilizable for considering performance based on revisions including a change in opinion including an upward or downward change in opinion of the analyst with regard to at least one investment.

A need also exists for a system, method, and computer readable medium containing instructions utilizable for adjusting a performance measure to accentuate a number of revisions issued by an analyst.

Yet another need exists for a system, method, and computer readable medium containing instructions utilizable for adjusting a performance measure according to a return amount adjustment accentuating the measure according to a return amount realized on an investment.

Still another need exists for a system, method, and computer readable medium containing instructions utilizable for adjusting a performance measure according to a small return penalty penalizing an analyst for small returns.

SUMMARY OF THE INVENTION

It is a feature and an advantage of the present invention to provide a system, method, and computer readable medium containing instructions utilizable for not only disseminating information concerning an analyst's or trader's actions, but also for evaluating the analyst's or trader's performance.

It is another feature and advantage of the present invention to provide a system, method, and computer readable medium containing instructions utilizable not only for providing raw information and data but also for evaluating performance based on returns observed after a particular revision, historical consistency, and/or the number of revisions made by the analyst or investing entity.

It is another feature and advantage of the present invention to provide a system, method, and computer readable medium containing instructions utilizable for considering performance based on revisions including a change in opinion including an upward or downward change in opinion of the analyst with regard to at least one investment.

It is another feature and advantage of the present invention to provide a system, method, and computer readable medium containing instructions utilizable for adjusting a performance measure to accentuate a number of revisions issued by an analyst.

It is another feature and advantage of the present invention to provide a system, method, and computer readable medium containing instructions utilizable for adjusting a performance measure according to a return amount adjustment accentuating the measure according to a return amount realized on an investment.

It is another feature and advantage of the present invention to provide a system, method, and computer readable medium containing instructions utilizable for adjusting a performance measure according to a small return penalty penalizing an analyst for small returns.

One embodiment of the present invention, particularly applicable to securities analysts, is now summarized.

System/Processing Description

Using a proprietary calculation, analysts may be given a series of performance scores that rank them relative to (1) other analysts in the "universe" and (2) other analysts that make predictions about a specific company. A total of five scores may be produced for each analyst:

Analyst Buy Score—Represents the analyst's Buy Score for all companies he/she covers, relative to the Universe of Analysts Analyst Sell Score—Represents the analysts Sell Score for all companies he/she covers, relative to the Universe of Analysts Analyst Company Buy Score—Represents the analyst's Score for a specific Company Analyst Company Sell Score—Represents the analyst's Score for a specific Company Analyst Overall Score—Represents the analysts overall Score for all companies that he/she covers All scores will be calculated based on an event—the revision of an analyst's earnings forecast.

Data Preparation Steps

The following must be complete before the Analyst calculations are begun:

1. Analyst Backend [ABE]—this process supplies the data from any suitable data base for the calculations.
2. ABE data relating to Brokers may be removed from the dB—in this embodiment we do not want to calculate Analyst scores for these non-analyst entities Analyst Scoring Logic The following logic will be used to calculate the scores for all analyst/company combinations in the Analyst database with at least 2 earnings forecast revisions that are at least 60 days (3 calendar months) old. These raw scores will later be ranked to formulate the final Analyst scores:

Raw Buy Analyst Score—Note, all inputs are based on calculated values related to earnings estimate revision changes For every analyst_id and company_id combination in the analyst_company_total table with 2 or more earnings estimate revisions, calculate a raw scare using the following logic (the logic is first summarized and then explained in detail):

Step 1 Calculate the average 5 day, 20 day and 60 day returns for earnings revisions [5/20/60 event returns] for each analyst/company combination (done by ABE)

Step 2 Calculate the t-statistic [t-stat] values for 5/20/60 event returns in absolute terms Step 3 Calculate the degrees of freedom [DF] values for 5/20/60 event returns Step 4 Look up probability value using DF and [t stat] for 5/20/60 event returns Step 5 Calculate raw score using conditional logic Step 6 Calculate adjustment to raw score Step 7 Calculate adjusted raw score Step 8 Calculate second adjustment to raw score and new raw score Step 9 Eliminate raw scores with returns greater than 1000%

Step 10 Sort and rank the raw scores to-produce the final Analyst Scores.

For every analyst_id and company_id combination in the analyst_company_total table in the Analyst dB with analyst_company_total.events>=2, perform the following logic:

Step 1

The 5 day, 20 day and 60 day return values are calculated by ABE for each analyst/company combination:

Average 5day return=analyst_company_total.avg_5dy_return_buy

Average 20day return=analyst_company_total.avg_20dy_return_buy

Average 60day return=analyst_company_total.avg_60dy_return_buy

Step 2

The t-stat needs to be calculated in absolute terms (i.e., a non-negative number) for the 5 day, 20 day and 60 day returns using the following formulas:

The 5/20/60 day_abs_tstat values may be rounded to 2 decimal places

Before beginning this calculation, we must ensure that we will not be dividing by zero. If the standard deviation is zero, then we will set the final raw score to zero and move to the next analyst/company combination.

IF analyst_company_total.sd__5dy_buy=0, THEN raw_score_buy=0

And start over with the next analyst/company buy combination

IF analyst_company_total.sd__20dy_buy=0, THEN raw_score_buy=0

And start over with the next analyst/company buy combination

IF analyst_company_total.sd__60dy_buy=0, THEN raw_score_buy=0

And start over with the next analyst/company buy combination $$5day\_abs\_tstat\_buy = \left| \frac{analyst\_company\_total.avg\_5dy\_return\_buy}{\left(\frac{analyst\_company\_total.sd\_5dy\_buy}{\sqrt{analyst\_company\_total.num\_5dy\_event\_buy}}\right)} \right|$$

$$20day\_abs\_tstat\_buy = \left| \frac{analyst\_company\_total.avg\_20dy\_return\_buy}{\left(\frac{analyst\_company\_total.sd\_20dy\_buy}{\sqrt{analyst\_company\_total.num\_20dy\_event\_buy}}\right)} \right|$$

$$60day\_abs\_tstat\_buy = \left| \frac{analyst\_company\_total.avg\_60dy\_return\_buy}{\left(\frac{analyst\_company\_total.sd\_60dy\_buy}{(\sqrt{analyst\_company\_total.num\_60dy\_event\_buy})}\right)} \right|$$

Step 3

The degrees of freedom are calculated by subtracting 1 from the number of observations for each return value:

5day_df_buy=analyst_company_total.num__5dy_event_buy-1

20day_df_buy=analyst_company_total.num__20dy_event_buy-1

60day_df_buy=analyst_company_total.man__60dy_event_buy-1

Step 4

For each return period, look up the probability using the absolute t-stat and DF for each respective calculation as inputs to a lookup table:

IF 5/20/60day_df_buy>100, THEN set 5/20/60day_df_buy=100

IF 5/20/60_abs_tstat_buy>20, THEN set 5/20/60day_abs_tstat_buy=20

IF 5/20/60day_abs tstat_buy<0.01, THEN set 5/20/60day_prob_buy=0

5day_prob_buy=lookup value indicated by using 5day_abs tstat_buy and 5day_df_buy 20day_prob_buy=lookup value indicated by using 20day_abs_tstat_buy and 20day_df_buy 60day_prob_buy=lookup value indicated by using 60day_abs_tstat_buy and 60day_df_buy

Step 5

The conditional raw score may now be calculated. The conditional raw scare will be based on the average of the conditional raw scores for the 5 day period, 20 day period and for the 60 day period, which will then be multiplied by 100. The condition to determine whether the probability is added or subtracted is based on whether the average return is positive or negative, the formula is as follows (cond_raw_score_buy):

$$\left\{ \frac{[1-(.5+or-5day\_prob\_buy)]+[1-(.5+or-20day\_prob\_buy)]+[1-(.5+or-60day\_prob\_buy)]}{3} \right\} * 10$$

Logic 5 day portion of calculation

IF analyst_company_total.avg__5dy_return_buy>0

THEN subtract 5day_prob_buy from 0.5 in numerator

This next case means that we have a negative average return for the events and we may add the probability ELSE add 5day_prob_buy to 0.5 in numerator 20 day portion of calculation IF analyst_company_total avg__20dy_return buy>0

THEN subtract 20day_prob buy from 0.5 in numerator

This next case means that we have a negative average return for the events and we may add the probability ELSE add 20day_prob_buy to 0.5 in numerator 60 day portion of calculation IF analyst_company_total.avg__60dy_return_buy>0

THEN subtract 60day_prob_buy from 0.5 in numerator

This next case means that we have a negative average return for the events and we may add the probability ELSE add 60day_prob_buy to 0.5 in numerator Final Step Take the average of the three calculated values above and multiply the result by 100

Step 6

Calculate the adjustment to the conditional raw score using the following formula (the adjustment is generally negative):

$$adj\_raw\_buy = (-20) * \left( \frac{1}{\sqrt{\frac{num\_5dy\_events\_buy + num\_20dy\_events\_buy + num\_60dy\_events\_buy}{3}}} \right)$$

num_5 dy_events_buy, num 20 dyevents_buy and num_20 dy_events_buy are taken from the analyst company_total table Note, the constant above may be changed for Analysts.

Step 7

Calculate the raw score by adding the adjustment to the conditional raw score:

raw_score_buy=(cond_raw_score_buy)+(adj_raw_buy)

here we are adding a negative number (adj_raw_sell), therefore the adjustment should generally be negative Step 8 new_raw_score_buy=raw_score_buy+(adj2_raw_buy)

Calculate second adjustment to raw_score_buy, variable name: adj2_raw_buy

The adj2_raw_buy is comprised of the following 4 components:

(1) 5 day returns portion of calculation

IF analyst_company_total.avg_5dy_return_buy>10

THEN 5day_adj2_buy=10

This next case means that we have a 5 day return less or equal than 1000% and should use the following formula. Note the formula is raised to the third power which is equivalent to the cube root ELSE 5day_adj2_buy=(100*analyst_company_total.avg_5dy_return_buy)$^{1/3}$ (2) 20 day returns portion of calculation IF analyst_company_total.avg_20dy_return_buy>10

THEN 20day_adj2_buy=10

This next case means that we have a 20 day return less than or equal 1000% and should use the following formula. Note the formula is raised to the third power which is equivalent to the cube root ELSE 20day adj2_buy=(100*analyst_company_total.avg_20dy_return buy)$^{1/3}$ (3) 60 day returns portion of calculation IF analyst_company_total.avg_60dyreturn_buy>10

THEN 60 day_adj2_buy>10

This next case means that we have a 60 day return less than or equal 1000% and should use the following formula. Note the formula is raised to the third power which is equivalent to the cube root ELSE 60day_adj2_buy=(100*analyst_company_total.avg_60dy_return_buy)$^{1/3}$ (4) Small Returns Penalty IF analyst_company_total.avg_60 dy_return buy>0.15

THEN small_ret_buy_adj=0

This next case means that we positive returns less than or equal 15%, so we will impose a penalty on the raw_buy_score ELSE small_ret_buy_adj=(100*(0.15—analyst_company_total.avg_60 dy_return_buy))

Final step

Combine the 4 components using the following formula to arrive at the final adj_raw:

adj2_raw_buy=(5 day_buy_adj2/3)+(20 day_buy_adj2/3)+(60 day_buy_adj2/3)–small_ret_buy_adj Step 9

Final step is to eliminate returns from the final scoring that have 60 day returns greater than 1000%

IF analyst_company_total.avg_60 dy_return_buy>10

THEN filter this raw score in the final scoring process

Step 10

Analyst Scoring Logic—Ranked (Final) Score

The following ranking system will be used to determine the final scores for each of the analyst scores:

Important Note: Only analyst that cover companies within the Analyst Universe should be given a final Analyst score in this example.

Analyst Buy Score

Once all of the raw scores have been calculated, we can then rank the raw buy scores by sorting the results in descending order and separate this list into 100 groups. The group with the highest set of scores will be given the ranking of 100 (signifying the best performance), and the group with the lowest set of scores will be given the ranking of 1 (signifying the worst). The analysts in each group should then be assigned a score equal to the group that they are in.

Step 1 Develop list of analysts who have received a raw_buy_score at companies within the Analyst Universe Step 2 Count the number of analysts in the list created in Step 1

Step 3 Sort raw_score list descending for all analyst id/company_id where there is a score. [Note: If a secondary sort is needed, use analyst company_total.avg.60 day return descending].

Step 4 Use the look up table below to divide the ranked list into seven groups, and then within each group divide the ranked raw-score list into an equal number of observations for each score within the group (as defined in Table A shown below).

Step 5 Record the score for the associated analyst_id and company_id combinations in the group Raw Sell Analyst Score—Note, all inputs are based on calculated values related to earnings estimate revision changes For every analyst id and company-id combination in the analyst company total table with 2 or more earnings estimate revisions, calculate a raw score using the following logic (the logic is first summarized and then explained in detail):

Step 1 Calculate the average 6 day, 20 day and 60 day returns for earnings revisions [5/20/60 event returns] for each analyst/company combination (done by ABE)

Step 2 Calculate the t-statistic [t-stat] values for 5/20/60 event returns in absolute terms Step 3 Calculate the degrees of freedom EDF] values for 5/20/60 event returns Step 4 Look up probability value using DF and [t-stat] for 5/20/60 event returns Step 5 Calculate raw score using conditional logic Step 6 Calculate adjustment to raw score Step 7 Calculate adjusted raw score Step 8 Calculate second adjustment to raw score and new raw score Step 9 Eliminate raw scores with returns greater than 1000%

Step 10 Sort and rank the raw scores to produce the final Analyst Sell Scores.

In this example, for every analyst id and company_id combination in the analyst_company_total table in the Analyst dB with analyst_company_total.events>=2 perform the following logic:

Step 1

The 5 day, 20 day and 60 day return values are calculated by ABE for each analyst/company combination, Average 5 day return=analyst_company_total.avg_5 dy_return_sell Average 20 day return=analyst_company_total.avg_ 2dy_return_sell Average 60 day return=analyst_company_total.avg_ 60 dy_return_sell Step 2

The t-slat needs to be calculated in absolute terms (i.e., a non-negative number) for the 5 day, 20 day and 60 day returns using the following formulas:

The 5/20/60 day_abs_tstat values may be rounded to 2 decimal places

Before beginning this calculation, we must ensure that we will not be dividing by zero. If the standard deviation is zero, then we will set the final raw score to zero and move to the next analyst/company combination.

IF analyst_company_total.sd_5 dy_sells=0, THEN raw_score=0

And start over with the next analyst/company buy combination

IF analyst_company_total.sd_20 dy_sells=0, THEN raw_score sell=0

And start over with the next analyst/company buy combination

IF analyst_company_total.sd_60 dy_sells=0, THEN raw_score_sell=0

And start over with the next analyst/company buy combination $$5day\_abs\_tstat\_sell = \left| \frac{analyst\_company\_total.avg\_5dy\_return\_sell}{\left( \frac{analyst\_company\_total.sd\_5dy\_sell}{\sqrt{analyst\_company\_total.num\_5dy\_event\_sell}} \right)} \right|.$$

$$20day\_abs\_tstat\_sell = \left| \frac{analyst\_company\_total.avg\_20dy\_return\_sell}{\left( \frac{analyst\_company\_total.sd\_20dy\_sell}{\sqrt{analyst\_company\_total.num\_20dy\_event\_sell}} \right)} \right|.$$

$$60day\_abs\_tstat\_sell = \left| \frac{analyst\_company\_total.avg\_60dy\_return\_sell}{\left( \frac{analyst\_company\_total.sd\_60dy\_sell}{(\sqrt{analyst\_company\_total.num\_60dy\_event\_sell})} \right)} \right|.$$

Step 3

The degrees of freedom are simply calculated by subtracting 1 from the number of observations for each return value:

5 day_df_sell=analyst_company_total.num_5 dy_event_event_sell-1

20 day_df_sell=analyst_company_total.num_20 dy_event_sell-1

60 day_df_sell=analyst_company_total.nun_60 dy_event_sell-1

Step 4

For each return period, lookup the probability using the absolute t stat and DF for each respective calculation as inputs to a lookup table:

IF 5/20/60 day_df_sell>100, THEN set 5/20/60 day_ df_sell=100

IF 5/20/60 abs_tstat_sell>20, THEN set 5/20/60 day_ abs_tstat_sell=20

IF 5/20/60 day_abs_tstat sell<0.01. THEN set 5/20/60 day_prob_sell=0

5 day_prob_sell=lookup value indicated by using 5 day_abs_tstat_sell and 5 day_df_sell 20 day_prob_sell=lookup value indicated by using 20 day_abs_tstat_sell and 20 day_df_sell 60 day_prob_sell=lookup value indicated by using 60 day_abs_tstat_sell and 60 day_df_sell Step 5

The conditional raw score may now be calculated. The conditional raw score will be based on the average of the conditional raw scores for the 5 day period, 20 day period and for the 60 day period, which will then be multiplied by 100. The condition to determine whether the probability is added or subtracted is based on whether the average return is positive or negative, the formula is as follows (cond_raw_score_ sell):

$$\left\{\frac{[1-(.5+or-5day\_prob\_sell)]+[1-(.5+or-20day\_prob\_sell)]+[1-(.5+or-60day\_prob\_sell)]}{3}\right\}*10.$$

Logic: (Note: We are now using less than zero, which is opposite of the Buy logic)

5 day portion of calculation

IF analyst_company total.avg__5 dy_return_sell<0

THEN subtract 5 day_prob from 0.5 in numerator

This next case means that we have a positive average return for the events and we may add the probability ELSE add 5 day_prob to 0.5 in numerator 20 day portion of calculation IF analyst company_total.avg__20 dy_return_sell<0

THEN subtract 20 day_prob from 0.5 in numerator

This next case means that we have a positive average return for the events and we need to add the probability ELSE add 20 day_prob to 0.5 in numerator 60 day portion of calculation IF analyst_company_total.avg__60 dy_return sell<0

THEN subtract 60 day_prob from 0.5 in numerator

This next case means that we have a positive average return for the events and we need to add the probability ELSE add 60 day_prob to 0.5 in numerator Final Step Take the average of the three calculated values above and multiply the result by 100

Step 6

Calculate the adjustment to the conditional raw score using the following formula (the adjustment will always be negative):

The adj2 raw is comprised of the following 4 components:

(1) 5 day returns portion of calculation

IF analyst_company_total.avg__5 dy_return_sell>10

THEN 5 day_sell_adj2=10

This next case means that we have a 5 day return less or equal than 1000% and should use the following formula. Note the formula is raised to the third power which is equivalent to the cube root ELSE 5 day_sell_adj2=(100*analyst_company_total.avg.__5 dy_return_sell)$^{1/3}$ (2) 20 day returns portion of calculation IF analyst_company_total.avg__20 dy_return_sell>10

THEN 20 day_sell_adj2=10

This next case means that we have a 20 day return less than or equal 1000% and should use the following formula. Note the formula is raised to the third power which is equivalent to the cube root ELSE 20 day_sell_adj2=(100*analyst_company_total.avg__20 dy_return_sell)$^{1/3}$ (3) 60 day returns portion of calculation IF analyst_company_total.avg__60 dy_return_sell>10

THEN 60 day_sell_adj2=10

This next case means that we have a 60 day return less than or equal 1000% and should use the following formula. Note the formula is raised to the third power which is equivalent to the cube root ELSE 60 day_sell_adj2=(100*analyst_company_total.avg__60 dy_return_sell)$^{1/3}$ $$adj\_raw\_sell = (-20)*\left(\frac{1}{\sqrt{\frac{num\_5dy\_events\_sell + num\_20dy\_events\_sell + num\_60dy\_events\_sell}{3}}}\right)$$

num__5 dy_events sell, num__20 dy_events_sell and num__60 dy_events_sell are all taken from the analyst_company_total table Step 7

Calculate the raw sell score by adding the adjustment to the conditional raw score:

raw_score_sell=(cond_raw_score_sell)+(adj_raw_sell)

here we are adding a negative number (adj_raw_sell), therefore the adjustment should generally be negative Step 8 new_raw_score_sell=raw_score_sell+(adj2_raw_sell)

Calculate second adjustment to raw_score sell, variable name: adj2_raw_sell (a) Small Returns Penalty IF analyst_company_total.avg__60 dy_return_sell<−0.08

THEN small_ret_sell_adj=0

This next case means that we negate returns less than or equal −8%, so we will impose a penalty on the raw_sell_score ELSE small_ret_sell_adj=(100*(−0.08—analyst_company_total.avg__60 dy_return_sell))

Final step

Combine the 4 components using the following formula to arrive at the final adj2_raw_sell:

adj2_raw_sell=(5 day_sell_adj2/3)+(20 day_sell_adj2/3)+(60 day$_{adj}$2/3)+small_ret_sell_adj Step 9

Final step is to eliminate returns from the final scoring that have 60 day returns greater than 1000%

IF analyst_company_total.avg_60 dy_return_sell>10

THEN filter this raw score in the final scoring process

Step 10

Analyst Scoring Logic—Ranked (Final) Score

The following ranking system may be used to determine the final scores for each of the analyst scores:

Important Note: Only analysts that cover companies within the Analyst Universe should be given a final Analyst score in this example Analyst Sell Score Once all of the raw sell scores have been calculated, we can then rank the raw sell scores by sorting the results in descending order and separate this list into 100 groups. The group with the highest set of scores will be given the ranking of 100 (signifying the best sell performance), and the group with the lowest set of scores will be given the ranking of 1 (signifying the worst sell performance). The analysts in each group should then be assigned a score equal to the group that they are in.

Step 1 Develop list of analysts who have received a raw_sell_score at companies within the Analyst Universe Step 2 Count the number of analysts in the list created in Step 1

Step 3 Sort raw_sell_score list descending for all analyst_id/company_id where there is a score. [Note: If a secondary sort is needed, use analyst company_total.avg_60 dy_return_sell descending].

Step 4 Use the look up table shown below to divide the ranked first into seven groups, and then within each group divide the ranked raw_sell score list into an equal number of observations for each score within the group (as defined in the table shown below).

Step 5 Record the score for the associated analyst_id and company_id combinations in the group LookUp Table A This look up table provides the information needed to assign the Analyst Buy Score and Analyst Sell Score for each analyst Using the rankings determined in Step 3 of Analyst Buy Score/Analyst Sell Score procedures derive the Analyst Buy Score and Analyst Sell Score split the rankings into the 7 groups in the table below.

| Group | Percentages of Total Observations | Analyst Buy Score Calculation | Analyst Buy Score |
|---|---|---|---|
| 1 | Top 5.0% (rounded up to the nearest whole number) | Divide the top 5% of total observations into 10 groups with an equal number of observations in each group | 91 to 100 |
| 2 | Next 12.5% (i.e. read sorted records until reach 17.5% of the total number o individuals from Step 1 of the scoring procedures) | Divide the 12.5% of total observations into 15 groups with an equal number of observations in each group | 76 to 90 |
| 3 | Next 18.0% (i.e. read sorted records until reach 35.5% of the total number of individuals from Step 1 of the scoring procedures) | Divide the 18.0% of total observations into 15 groups with an equal number of observations in each group | 61 to 75 |
| 4 | Next 29.0% (i.e. read sorted records until reach 64.5% of the total number of individuals from Step 1 of the scoring procedures) | Divide the 29.0% of total observations into 20 groups with an equal number of observations in each group | 41 to 60 |
| 5 | Next 18.0% (i.e. read sorted records until reach 82.5% of the total number of individuals from Step 1 of the scoring procedures) | Divide the 18.0% of total observations into 15 groups with an equal number of observations in each group | 26 to 40 |
| 6 | Next 12.5% (i.e. read sorted records until reach 95.0% of the total number of individuals from Step 1 of the scoring procedures) | Divide the 12.5% of total observations into 15 groups with an equal number of observations in each group | 11 to 25 |
| 7 | Last 5.0% (rounded up to the nearest whole number) (i.e. read sorted records until reach 100.0% of the total number of individuals from Step 1 of the scoring procedures) | Divide the last 5% of total observations into 10 groups with an equal number of observations in each group | 1 to 10 |

In accordance with the principles of the present invention, an analyst's performance (or other investment professional or investment advisor) is evaluated by utilizing information pertaining to at least one revision made by the analyst involving at least one investment. This evaluation includes determining a conditional performance score indicative of the analyst's performance relative to other analysts. The performance score is determined, at least in part, by considering an average historical performance of the investment following the revision. In addition, the performance score is also determined using a historical consistency of the analyst's performances with respect to revisions or reports involving the investment, and a number of revisions, recommendations, or opinions made by the analyst. Then, the performance score may be adjusted according to one or more adjustments to generate a final performance score.

These performance scores may be determined based on analyst recommendations, such as upward or downward revisions or a combination of both. In particular, a score based on upward revisions, or an upward revision performance score, corresponds to the predictive nature of an analyst with respect to predicting or influencing increases in earning. In contrast, a score based on downward revisions, or a downward revision performance score, corresponds to the predictive nature of an analyst with respect to predicting or influencing decreases in earnings. Similarly, a combined score or, for example, an average of the two previous scores, corresponds to the overall predictive nature of the analyst.

Hence, the present invention provides a method, system, and computer readable medium storing computer executable instructions for evaluating an analyst's performance by utilizing information pertaining to at least one revision made by the analyst involving at least one investment. In one embodiment, the present invention includes determining a conditional performance score indicative of the analyst's performance relative to other analysts. This conditional performance score is determined at least in part by considering an average historical performance of the at least one investment following the at least one revision, a historical consistency of the analyst's performances with respect to revisions involving the at least one investment, and a number of revisions made by the analyst. In addition, the present invention includes adjusting the conditional performance score of the analyst according to a return amount adjustment to generate a final performance score.

In another embodiment, the present invention provides a method, system, and computer readable medium storing computer executable instructions for evaluating an analyst's performance. This embodiment includes utilizing information pertaining to at least one revision made by the analyst involving at least one investment, including an upward or downward change in opinion of the analyst with regard to at least one investment. In addition, the present invention includes calculating a raw conditional performance score indicative of the analyst's performance relative to other analysts, said raw conditional performance score determined at least in part by considering a measure of variability of the analyst's performance, an average historical performance of the at least one investment following the at least one revision, a standard deviation of the at least one revision, a number of revisions made by the analyst, and a likelihood that the at least one revision will actually produce an expected result. From there, the invention includes adjusting said raw conditional performance score according to a return amount adjustment to produce a final performance score.

In another embodiment, the present invention provides a method of evaluating an analyst's performance by utilizing information pertaining to at least one revision made by the analyst involving at least one investment. In this embodiment, the invention includes calculating a raw conditional performance score indicative of the analyst's performance relative to other analysts. The raw conditional performance score may be determined at least in part by considering a measure of variability of the analyst's performance, an average historical performance of the at least one investment following the at least one revision, a standard deviation of the at least one revision, a number of revisions made by the analyst, and a likelihood that the at least one revision will actually produce an expected result. Subsequently, the invention adjusts the raw conditional performance score according to a modifier accentuating the number of revisions made by the analyst. In addition, the raw conditional performance score may be adjusted according to a small return penalty penalizing the analyst for small returns to produce a final performance score.

In still yet another embodiment, the present invention includes a method, system, and computer readable medium storing computer executable instructions for evaluating an analyst's performance, and includes utilizing information pertaining to at least one upward or downward revision including an upward or downward change in opinion of the analyst with regard to at least one investment. This embodiment also includes calculating a performance score indicative of the analyst's performance relative to other analysts, said performance score determined at least in part by considering a measure of variability of the analyst's performance, an average historical performance of the at least one investment following the at least one upward or downward revision, a standard deviation of the at least one upward or downward revision, a number of upward or downward revisions made by the analyst, and a likelihood that the at least one upward or downward revision will actually produce an expected result. In addition, this embodiment includes comparing the analyst's performance score against performance scores of other analysts to produce at least one of an upward, downward or combined revision ranking.

In yet another embodiment, a method of evaluating an analyst's performance by utilizing information pertaining to at least one revision made by the analyst involving at least one investment is disclosed. In this embodiment, the invention includes determining a first average return value (ave. $return_1$), second average return value (ave. $return_2$), and third average return value (ave. $return_3$) for the at least one revision. Each of the first, second, and third average return values corresponds respectively to an average rate of return on the at least one revision involving the investment for a first period of time ($time_1$), a second period of time ($time_2$), and a third period of time ($time_3$). From there, a first t-stat value ($t\text{-}stat_1$) for ave. $return_1$, a second t-stat value ($t\text{-}stat_2$) for ave. $return_2$, and a third t-stat value ($t\text{-}stat_3$) for ave. $return_3$, are calculated, in absolute terms. In particular, the first, second, and third t-stat values are calculated by utilizing ave. $return_1$, ave. $return_2$, ave. $return_3$, a first standard deviation ($SD_1$), a second standard deviation ($SD_2$), and a third standard deviation ($SD_3$), a total number of revisions ($revisions_1$) occurring more than or equal to $time_1$ before said evaluating, a total number of revisions ($revisions_2$) occurring more than or equal to $time_2$ before said evaluating, and a total number of revisions ($revisions_3$) occurring more than or equal to $time_3$ before said evaluating. Subsequently, a first degree of freedom ($DF_1$) for ave. $return_1$, a second degree of freedom ($DF_2$) for ave. $return_2$, and a third degree of freedom ($DF_3$) for ave. $return_3$ are calculated. The invention then contemplates determining a first probability ($prob_1$) for $time_1$ by utilizing $t\text{-}stat_1$ and $DF_1$, a second probability ($prob_2$) for $time_2$ by utilizing $t\text{-}stat_2$ and $DF_2$, and a third probability ($prob_3$) for $time_3$ by utilizing $t\text{-}stat_3$ and $DF_3$. A raw conditional performance score for the analyst is generated by utilizing $prob_1$, $prob_2$, $prob_3$. A conditional performance score (cond. performance score) may be generated by adding a modifier (adjustment), which may be determined by utilizing $revisions_1$, $revisions_2$, and $revisions_3$, to the raw conditional performance score. From there, the invention contemplates generating a small return penalty by subtracting a penalty from an average of return factors corresponding to $time_1$, $time_2$, and $time_3$, wherein for upward revisions the penalty is 0 if ave. $return_3$ is greater than 15%, else the penalty is equal to 15% minus ave. $return_3$, wherein for downward revisions the penalty is 0 if ave. $return_3$ is less than −8%, else said penalty is equal to −8% minus ave. $return_3$, wherein the first period of time return factor is ten if ave. $return_1$ is greater than ten, else the first period of time return factor is equal to a cube root of a product of 100 and ave. $return_1$, wherein the second period of time return factor is ten if ave. $return_2$ is greater than ten, else the second period of time return factor is equal to a cube root of a product of 100 and ave. $return_2$, and wherein the third period of time return factor is ten if ave. $return_3$ is greater than ten, else the third period of time return factor is equal to a cube root of a product of 100 and ave. $return_3$. Using the above factors, a final performance score (performance score) indicative of the analyst's performance may be generated by adding the small return penalty to the conditional performance score.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

Other objects of the present invention will be evident to those of ordinary skill, particularly upon consideration of the following detailed description of the preferred embodiments.

Notations and Nomenclature

The detailed descriptions which follow may be presented in terms of program procedures executed on computing or processing systems such as, for example, a stand-alone gaming machine, a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

BRIEF DESCRIPTION OF THE DRAWINGS

FIGS. 5a-5b depict one example of a user interface utilizable for displaying an analyst evaluation according to the principles of the present invention;

FIGS. 5c-5d depict one example of a user interface displaying examples of revisions utilizable in conjunction with the principles of the present invention;

FIG. 18 shows a set of tabulated results of an evaluation performed according to the principles of the present invention.

BEST MODE FOR CARRYING OUT THE INVENTION

Reference now will be made in detail to the presently preferred embodiments of the invention. Such embodiments are provided by way of explanation of the invention, which is not intended to be limited thereto. In fact, those of ordinary skill in the art may appreciate upon reading the present specification and viewing the present drawings that various modifications and variations can be made.

For example, features illustrated or described as part of one embodiment can be used on other embodiments to yield a still further embodiment. Additionally, certain features may be interchanged with similar devices or features not mentioned yet which perform the same or similar functions. It is therefore intended that such modifications and variations are included within the totality of the present invention.

In accordance with the principles of the present invention, an analyst's performance is evaluated by utilizing information pertaining to at least one revision made by the analyst involving at least one investment. This evaluation includes determining a conditional performance score indicative of the analyst's performance relative to other analysts. The performance score is determined at least in part by considering an average historical performance of the investment following the revision. In addition, the performance score is also determined using a historical consistency of the analyst's performances with respect to revisions involving the investment, and a number of revisions made by the analyst. Then, the performance score may be adjusted according to one or more adjustments to generate a final performance score.

These performance scores may be determined based on upward or downward revisions or a combination of both. In particular, a score based on upward revisions, or an upward revision performance score, corresponds to the predictive nature of an analyst with respect to predicting or influencing increases in earning. In contrast, a score based on downward revisions, or a downward revision performance score, corresponds to the predictive nature of an analyst with respect to predicting or influencing decreases in earnings. Similarly, a combined score, or for example an average of the two previous scores, corresponds to the overall predictive nature of the analyst.

Figure 1:
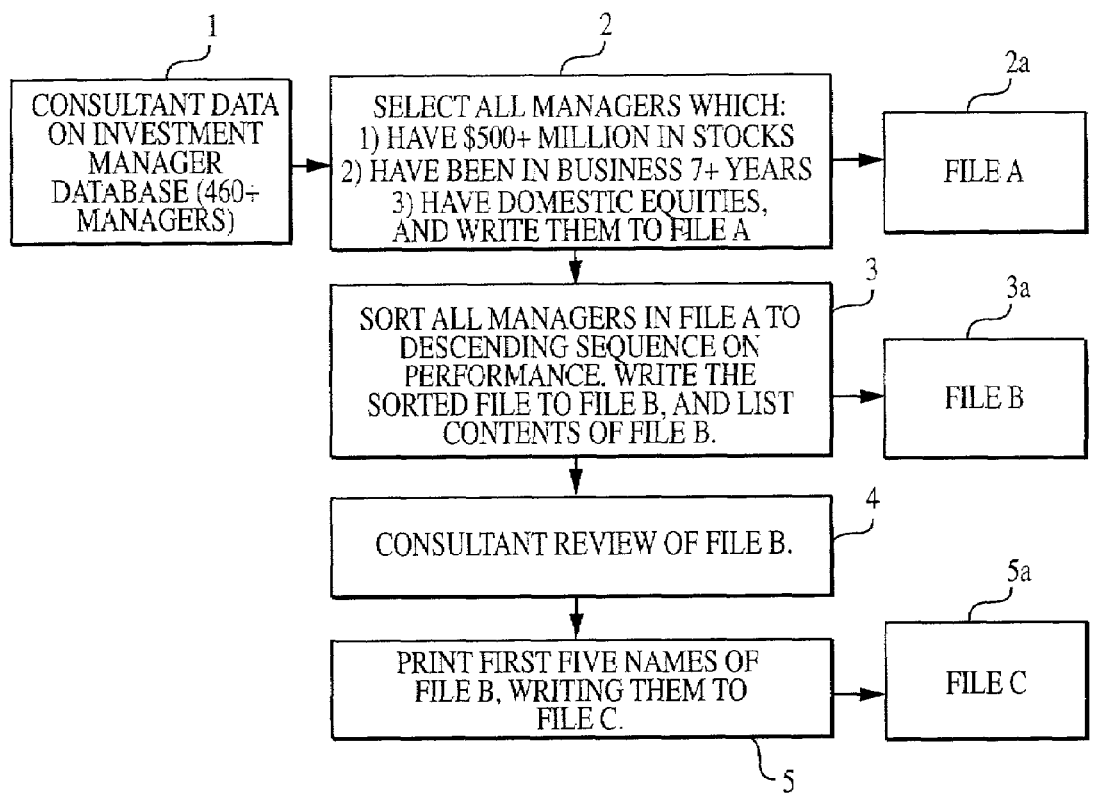
FIG. 1 illustrates a prior art stock and cash portfolio development system.
Figure 2:
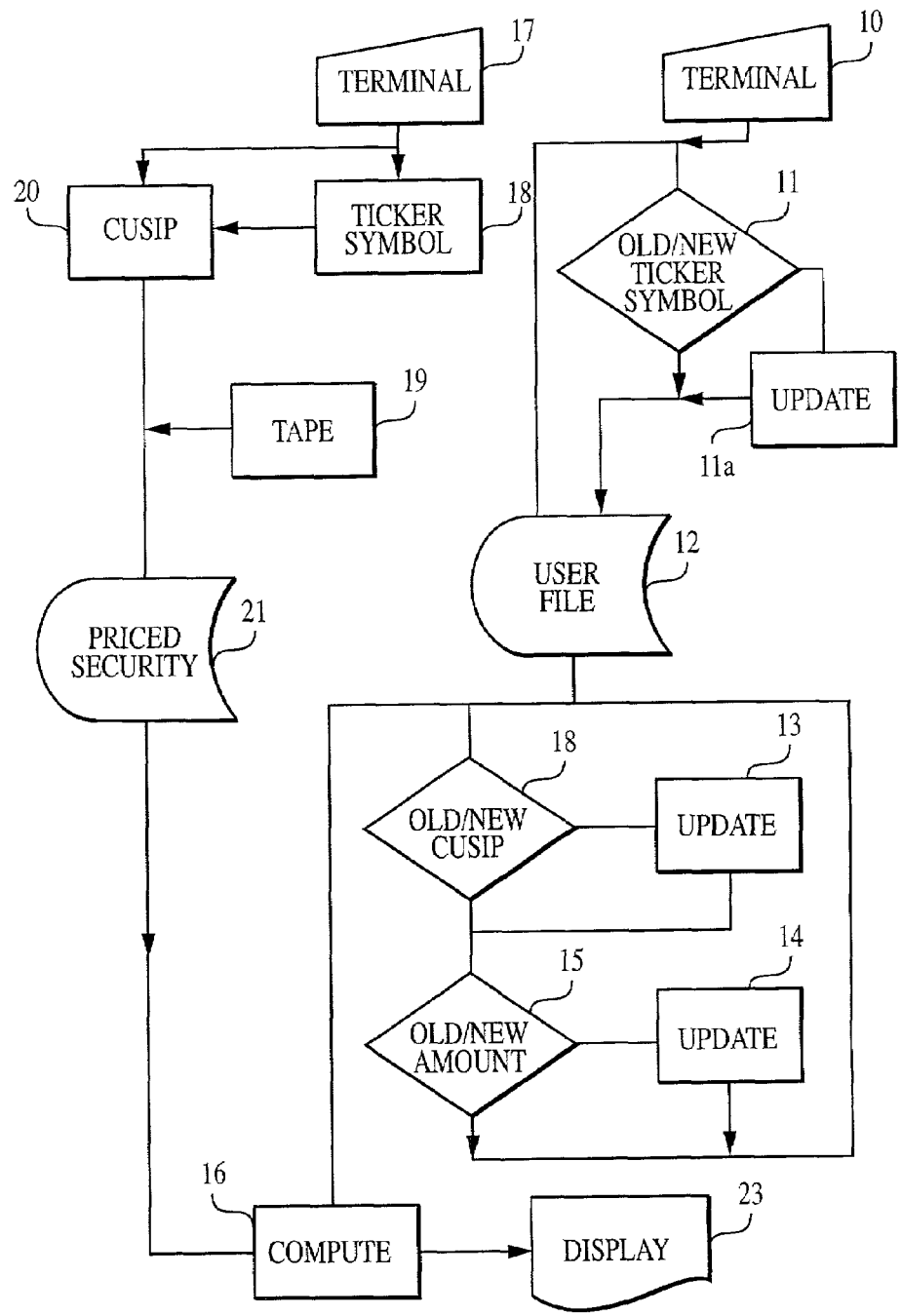
FIG. 2 illustrates a prior art securities valuation system.
Figure 3:
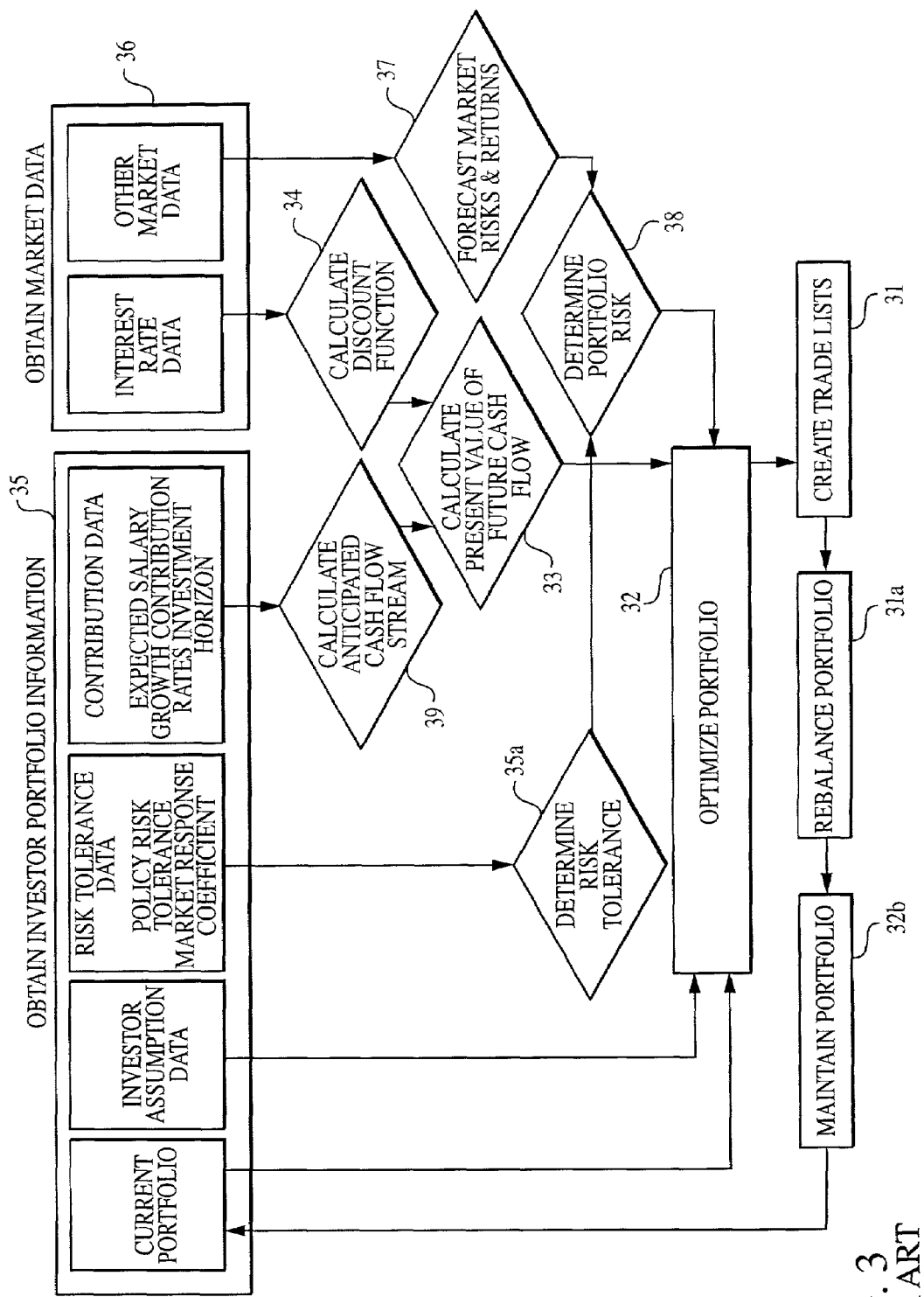
FIG. 3 illustrates a prior art investment fund management system.
Figure 4:
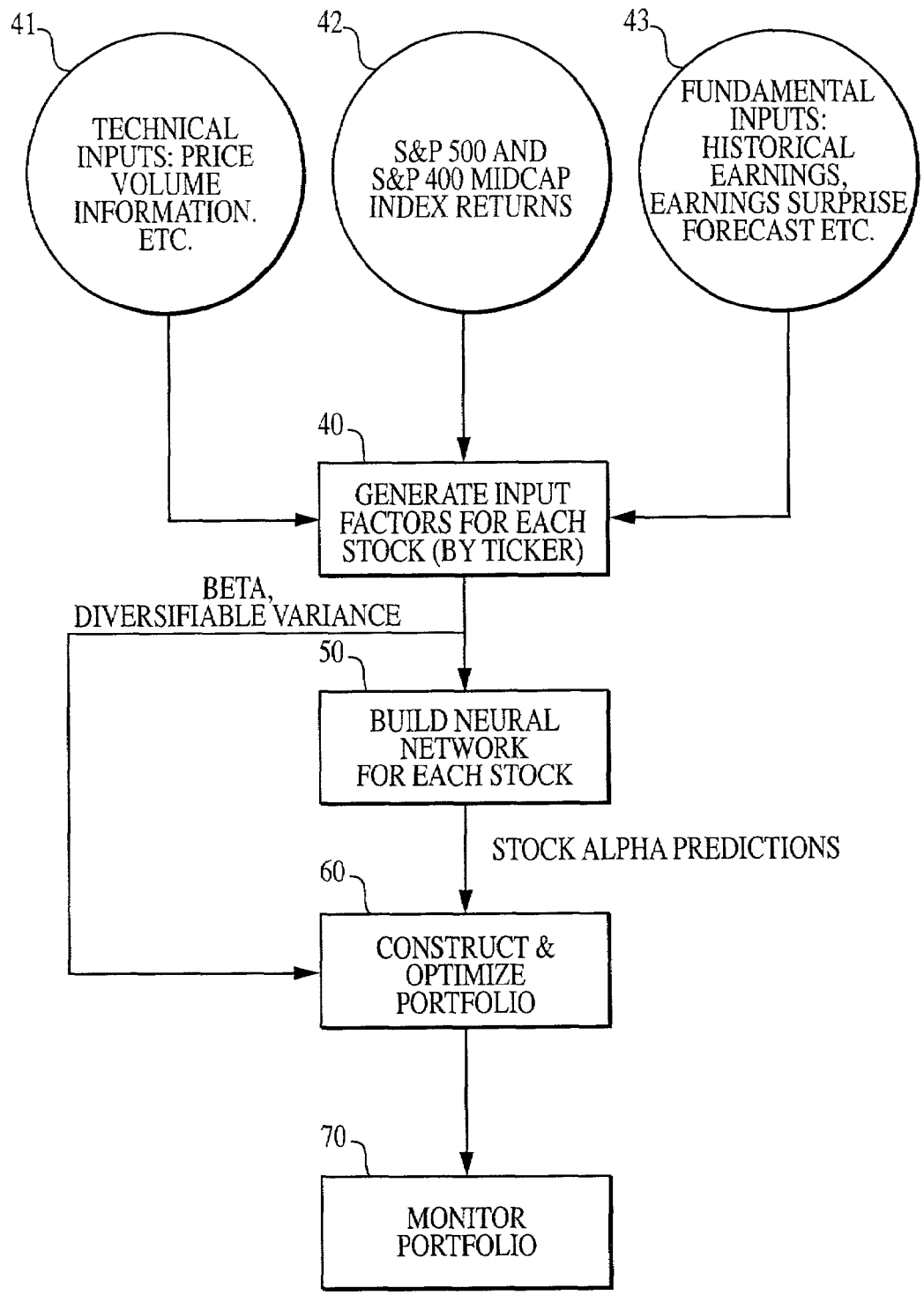
FIG. 4 illustrates a prior art data processing system for selecting securities and constructing investment portfolios based on a set of artificial neural networks.
Figure 5B:

Referring first to FIGS. 5a and 5b, one example of a user interface 500 utilizable for displaying, for example, analyst performance scores is illustrated. In FIG. 5, the user interface displays a wide variety of information including performance scores for any number of companies 510. To calculate the company performance scores in this example, the scores for each of the analysts covering a particular company are averaged to produce an overall company score. In addition to listing and determining an average of the performance scores of all the analysts covering a company, any combination of performance scores may optionally be determined and listed. For instance, an average of only the upward or downward revision performance scores for the analysts covering a particular company may be determined and listed. Alternatively, a user may just as easily elect to view a list of only the upward or downward revisions for a single company. Similarly, an index of individual analyst performance scores, independent of the companies, based either on upward or downward revisions or both may also be determined and listed.

Advantageously, these performance scores are a measure of the predictive nature of each analyst's revisions. In one example, a revision is a change in the opinion of an analyst on a performance of a company or other entity, for example, overall company revenues, profits, market share, and/or how much a company is likely to earn per share in a future quarter, fiscal year, or other time period. For instance, as shown in FIGS. 5c-5d, other examples of revisions utilizable with embodiments of the present invention include detailed analyst recommendations on whether to sell, hold or buy a security 530, earnings surprises 532, estimates submitted 534, price/earnings 536, momentum, price/earning ratio, P/E and growth rates, and/or PEG ratio, and/or other similar information/estimates. Some causes for an upward revision include: the release of a good quarterly or annual earnings report, a positive analysts' meeting or conference call with company executives, or improvements at a similar company in the same industry. Likewise, causes for a downward revision include: the release of a grim quarterly or annual earnings report, a negative analysts' meeting or conference call with company executives, or worsening results at a similar company in the same industry.

In the present invention, the higher the score of the analyst (with one-hundred, for example, being the highest), the more predictive on a historical basis. Furthermore, the performance score increases with the number of beneficial revisions of the analyst. For instance, the performance score increases when a rate of return of an investment increases and the revision is an upward revision, or when a rate of return of the investment decreases and the revision is a downward revision. Likewise, the performance score decreases when a rate of return of the investment decreases and the revision is an upward revision, or when a rate of return of the investment increases and the revision is a downward revision. Thus, a high upward revision performance score corresponds to historically high positive returns (e.g., the analyst issued an upward revision, and the stock went up in value). Similarly, a high downward revision performance score corresponds to high negative returns (e.g., the analyst issued a downward revision, and the stock went down in value). In addition, it should be noted that although in this particular embodiment corporate securities are mentioned as being one example of the analyst's revisions, the instant invention is also applicable to and should be construed as encompassing any other form of similar investment. Some examples include bonds, currencies, commodities, paper, precious metals, minerals, natural resources, mutual funds, and the like or any other analogous investments and/or investment entities.

As will be discussed in greater detail below, several factors are incorporated into these performance scores. For instance, an analyst's average return history (e.g., a return amount typically in a percentage calculated over a predetermined period of time after the analyst's revision) for both upward and downward forecast revisions may initially be considered. Indeed in alternative embodiments, this factor is accorded the greatest amount of weight. Next, the analyst's historical consistency at issuing upward and downward revisions in a company's stock, as measured by, for example, standard deviation and the like are also considered. In a related manner, a measure of variability of the analyst's performance may also be considered. Similarly, a likelihood that the revision will actually produce an expected result, as embodied by statistical characteristics such as probability and the like are also factored into the calculation. Finally, the number of revisions that make up an analyst's track record is factored into the performance score for the simple reason that the more times an analyst has demonstrated good judgment the better. Other factors are optionally used as well.

As to the analyst's average return history, any number of return periods may be considered. For example, in one embodiment, two periods are utilized. In other embodiments, three or more periods may be used. Furthermore, any length of time is possible. Thus, in some cases, two periods (e.g., a relatively short period of time and a relatively long period of time) suffices. In other cases, one or more intermediate periods of time may also be included into the calculation. As examples, three month and six month periods may be used. As another example, five, twenty, and sixty day periods may be used. Similarly, one week, one month, and two month periods are also possible.

In addition to the above, other factors may optionally be considered as well. For example, the above factors may be utilized to generate a conditional or raw performance score, which in turn may be modified or adjusted to produce a final performance score. For instance, a modifier accentuating the number of revisions made by the analyst may be factored into the conditional performance score. In other cases, a return amount adjustment may be made to reward or penalize an analyst for small or large return amounts. For example, the return amount adjustment may include a small return penalty penalizing or reducing the analyst's performance score for returns less than a predetermined amount. More specifically, a penalty may be imposed for returns of less than a predetermined amount as calculated over a predetermined period of time. Hence, with upward revisions, a penalty might be imposed for returns of less than approximately 15% as calculated over approximately a two month period of time. In contrast, with downward revisions, a penalty might be imposed for returns greater than –8% as calculated over a two month period of time. Likewise, high returns may also result in increases to the analyst's performance score. Further, adjustments need not be limited to return amounts. As an example, adjustments may be made to a performance score for an extremely large number of accurate trades. Indeed, the present invention contemplates modifications or adjustments for nearly any factor utilizable for predicting accuracy or reliability.

Returning to the interface displayed in FIG. 5, in addition to listing the average scores for all of the analysts associated with a particular company, the interface may also be used to list each of the highest performing analysts for categories pertaining to downward and upward performance scores. Furthermore, interface 500 may also be linked to or used to display information concerning each analyst and/or the corresponding security. Likewise, the interface sponsor may optionally include commentary concerning, for example, any securities or analysts, advertisements utilizable as a source of revenue, instructions or help information for beginning users, and information concerning or tracking the activities of exceptionally high performing analysts, or other similar features.

While the interface depicted in FIG. 5 is used to view the average of the performance scores associated with a particular list of companies, other listings are also possible. For example, a user may select a particular analyst for review. In this case, each of the upward, downward, and combined performance scores for that analyst may be viewed. Furthermore, if the selected analyst is responsible for monitoring more than one company, multiple values for upward, downward, and combined performance scores (e.g., one score for each company) may be listed. Similarly, a user may select any combination of analysts or sets/groupings of data including, for example, all analysts dealing with or investing in a particular industry or market, or other analogous listings of information.

Figure 6:
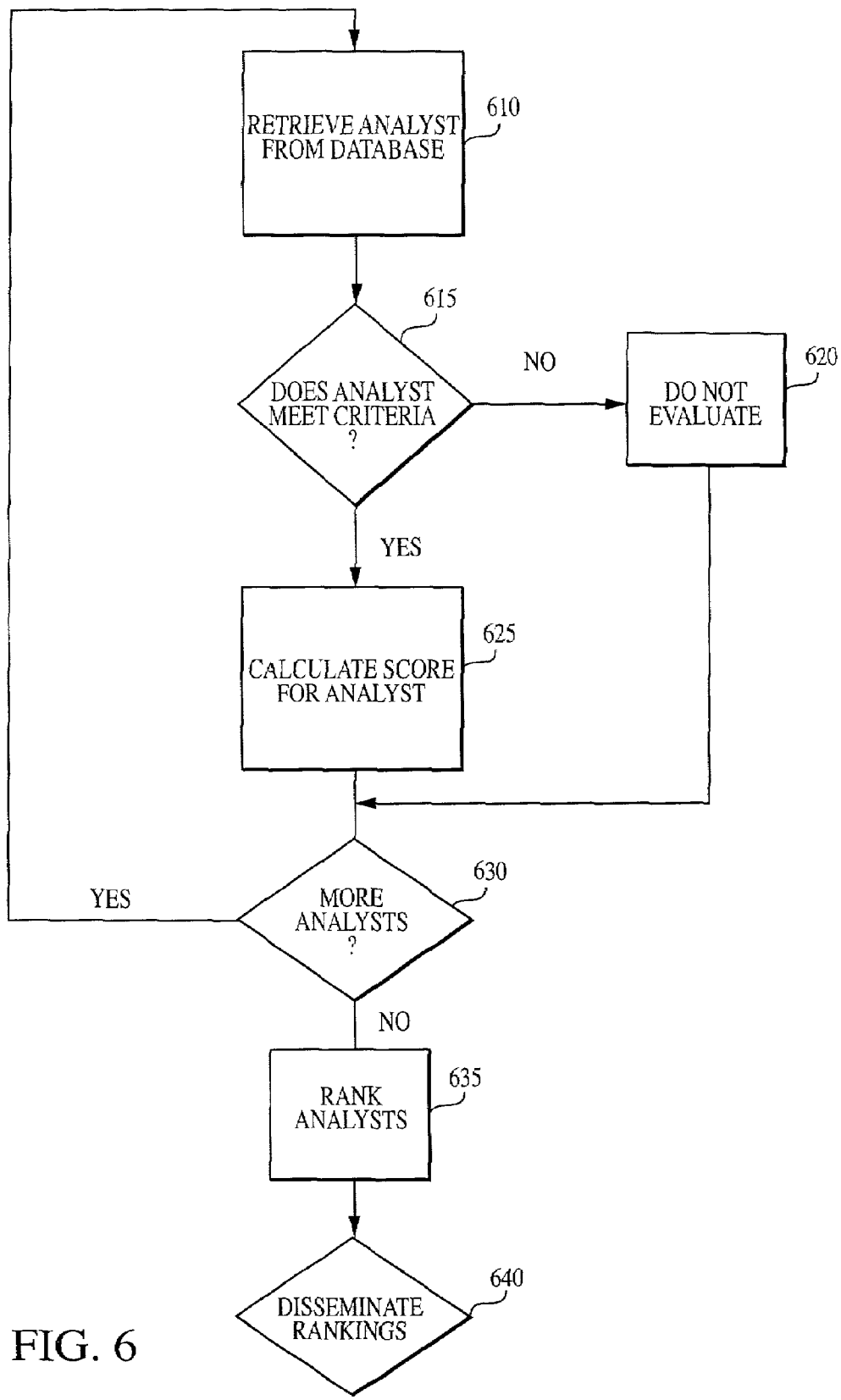
FIG. 6 is a flow diagram illustrating a process for evaluating analysts according to the principles of the present invention.

A broad overview of the process of one embodiment of the present invention for calculating performance scores is now illustrated with reference to FIG. 6. First, a list of analysts is retrieved from one or any number of databases 610. As will be discussed in greater detail below with reference to FIG. 17, the database may include a list of any or all of a variety of combinations of analysts. For example, all of the analysts tracking companies in a single industry may be included. Similarly, the database may include all insiders filing insider documents with the SEC. In other embodiments, other similar or analogous techniques may be utilized to generate a list of analysts. For example, any one of a variety of databases tracking industry leaders may just as easily be used.

After retrieving the list of analysts, a smaller list of analysts to be evaluated is optionally generated according to predetermined criteria. In this regard, a check is performed identifying analyst that meet predetermined criteria 615. In this example, any number of criteria may be used to generate this list. For example, each analyst may be required to be an actual living person, thereby excluding brokerage firms. Thus, in this scenario, any entities that are not people, such as companies, partnerships, or trusts, are removed from the evaluation list. As another example, the market capitalization of the company being monitored may be required to be greater than a predetermined amount, such as, for instance, $50 million. Third, each analyst may be required to have issued a minimum number of revisions that have been in existence for a certain period of time. For instance, some embodiments may require analysts to have issued at least two revisions, with each revision being at least sixty days old. Other embodiments may require more or fewer revisions, which in turn may be more recent or older than sixty days. These requirements are disclosed for exemplary purposes only and it is to be understood that other types of analyst requirements are possible within the scope of the invention. For instance, non-people analysts such as partnerships, corporations, and other joint ventures or entities are also possible where groups of analysts participate in recommendations and/or decision making. Thus, a group of, for example, Morgan Stanley analysts may be compared against Goldman-Sachs analysts, individually or overall. Similarly, entities not having market capitalization or trading limits are also possible. Furthermore, the concepts of the present invention are applicable to entities investing in investments other than securities, such as bonds, mutual funds, or any other similar investments, trading securities, investments and the like.

If the analyst does not meet the predetermined criteria (615), a message is returned, and the analyst is not evaluated 620. On the other hand, if the analyst meets the predetermined criteria, processing continues with the calculation of a performance score for the analyst 625. As will be discussed below, this performance score may reflect upward revisions, downward revisions, or a combination, and/or average distribution of the two. From there, processing continues with a determination of whether more analysts exist to be ranked 630.

If more analysts are to be ranked, processing returns to 610. If the list of analysts to be ranked is complete, each of the analysts meeting the predetermined criteria are ranked 635. Subsequently, these rankings may optionally be disseminated 640 via, for example, a user interface similar to that depicted in FIG. 5 in a local or global setting, e.g., intranets, the Internet, and the like. Alternatively, the rankings may be disseminated in any other similar or analogous medium, such as in a magazine or newspaper, a trade journal, television, and radio or the like.

Although in this embodiment a list of analysts to be evaluated is determined according to predetermined criteria, it is to be understood that other alternatives are also possible. For instance, the present invention is to be construed as including scenarios where a user enters or selects a predetermined listing of analysts for evaluation. In such a case, only the particular entities entered by the user would be evaluated. It is also possible that a mixed grouping of investment entities and types may be evaluated. For instance, it is possible within the scope of the present invention to evaluate corporate insiders, nonperson joint ventures, brokerage firms, and/or corporations, and any other types of investment entities or combinations thereof.

Figure 7:
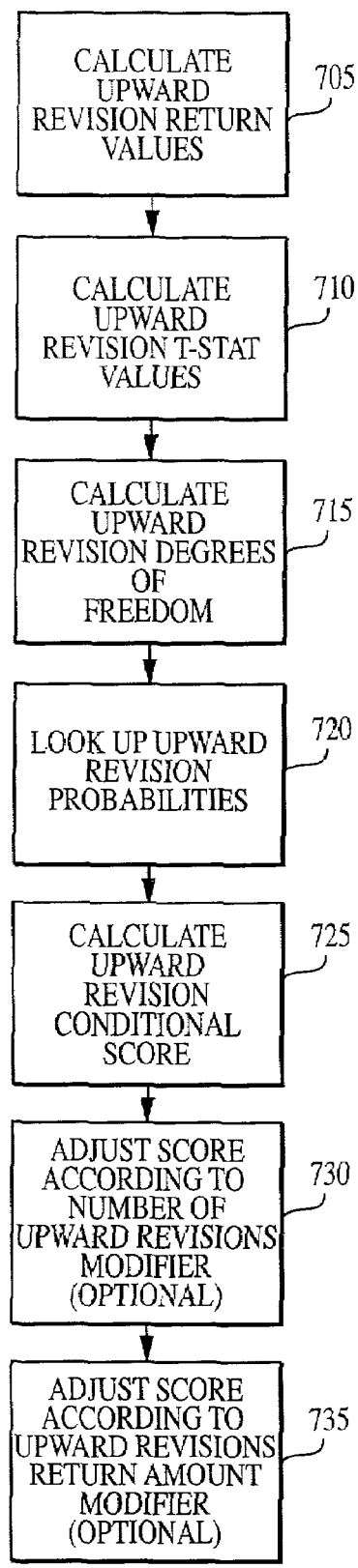
FIG. 7 is a flow diagram illustrating a high level process for generating an upward revision performance measure utilizable in the process of FIG. 6.

The calculation of an upward revision performance score is now described with reference to FIG. 7. In this example, one or more rates of return on an investment corresponding to an analyst's upward revision, taken a predetermined period of time after issuance of the upward revision, are utilized in the generation of the performance score. Thus, one or more return values for one or more return intervals are initially calculated or gathered for each analyst 705 by any suitable means. In this particular embodiment, three return values, one for a short period of time, one for an intermediate period of time, and one for a long period of time, are taken. As to the actual amount of time associated with each period, any lengths may be used. For example, the short period of time may be five days or a week, the intermediate period may be twenty days or a month, and the long period may be sixty days or two months. Furthermore, three return values are utilized in this embodiment for exemplary purposes only. In actual practice any number of return values, at any number of time intervals, are allowed so long as they are suitable proxies for, e.g., short, long, and optionally intermediate periods of time. As an example, two return values, one at 3 months (e.g., 13 weeks) and a second at 6 months (e.g., 26 weeks), may just as easily be utilized.

In accordance with the principles of the present invention and as discussed briefly above, these scores or measures reflect an analyst's performance and are generated by considering a number of performance factors. One embodiment of the present invention uses a measure of the analyst's historical performance as determined by rates of return over certain periods of time after a revision. Another example may include considering the analyst's success at selecting entry and exit points in the investment. Additionally, as will be discussed below, the analyst's performance score may be modified or weighted based on a number of revisions made by the analyst, the magnitude of a return, or other similar factors. Of course, the above factors are listed for exemplary purposes only and it is to be understood that other similar and analogous factors may also be considered so long as they provide an accurate and/or estimated measurement of the analyst's success or lack thereof.

After calculating the return values, a statistical measure of confidence in the analyst's performance may be calculated for each return value 710. As one example, a t-statistic or t-stat, taken in absolute terms, is utilized as this measure of confidence. The t-stat is a measure on a random sample (or pair of samples) in which a mean (or pair of means) appears in the numerator, and an estimate of the numerator's standard deviation appears in the denominator. The latter estimate is based on the calculated sample variance estimates of the samples. Alternatively, other standard variance measures or other suitable indices of variability may optionally be used in place of standard deviation, and/or t-stat. If these calculations yield a value of (t) that is sufficiently different from zero, the test is considered to be statistically significant.

In this embodiment, the t-stats for each return period may be determined by:

$$\text{upward revision } t \text{ stat} = \left| \frac{\text{upward revision return}}{\left( \frac{\text{upward\_revision\_SD}}{\sqrt{\text{total\_number\_of\_upward\_revisions}}} \right)} \right|$$

In this example since three intervals are being utilized, three t-stat values are calculated, one for each interval.

To prevent division by zero, if the standard deviations for any of the time intervals are zero, then the conditional upward revision performance score for that interval is set to zero. In addition, although the t-stat is used in this example, other measures of confidence may just as easily be incorporated in the present invention. As another example, the z-statistic or other similar measurements of variability, dispersion, or consistency may be used. Furthermore, regardless of what method is used to produce the measure of confidence, the measure of confidence may also be manipulated or weighted to consider other factors, so long as it accurately reflects or estimates, for instance, the analyst's return history and historical consistency at issuing forecast revisions in the investment.

After calculating the measures of confidence (e.g., the t-stats for each time interval or return period), one or more degrees of freedom are determined by subtracting, for example, one from the number of revisions for each return value 715. Hence, with three return values, three degrees of freedom are generated. The degrees of freedom are used to describe the number of values in a final calculation of a statistic that are free to vary, and measure, for example, repetition, repeatability, and certainty. Hence, each degree of freedom is determined by: upward revision degree of freedom=total number of upward revisions−1

Next, a probability indicating, for example, the likelihood that an analyst's and/or other investing entity's actions will actually produce the expected result, is determined for each return interval 720. Thus, with three return intervals, three probabilities are generated. In this example, the degrees of freedom, along with the absolute t-stats, are used in determining a probability for each return period 720. Specifically, subject to the following optional conditions, the probabilities are looked-up in a common statistics lookup table using each return interval's degree of freedom and t-stat. If any of the degrees of freedom are greater than 100, then that degree of freedom is set to 100 before looking up the probability. If any of the absolute t-stats are greater than 20, then that absolute t-stat is set to 20 before looking up the probability. Finally, if any of the absolute t-stats are less than 0.01, then the corresponding probability is simply set to 0. In addition, the probabilities may be calculated utilizing other methods. For instance, the t-stat and the degree of freedom may undergo further manipulation before looking up the probability. Alternatively, other analogous methods may be utilized in place of the look-up table to determine the probabilities.

Subsequent to determining the probabilities for each return period, a conditional upward revision performance score, or raw conditional upward revision performance score, is generated 725. Although other methods are possible, the conditional performance score in this example is determined by:

$$\text{cond\_up\_per\_score} = \left\{ \frac{[1-(.5+\text{or}-\text{up\_prob1})]+[1-(.5+\text{or}-\text{up\_prob2})]+[1-(.5+\text{or}-\text{up\_prob3})]}{3} \right\} * 100$$

In this formula, up_prob1, up_prob2, up_prob3 correspond respectively to the probability for a first, second, and third return interval. Referring again to the above formula, whether the probabilities are added or subtracted is determined by the following conditions. If any of the three probabilities are greater than zero, then that probability is subtracted from 0.5. Otherwise, 0.5 is added to the probability.

The conditional upward revision performance score represents an initial analyst performance measure with respect to upward revisions and may undergo one or more of any number of manipulations to result in various other refined performance measures and ultimately a final upward revision performance score. As an example, the conditional performance score may be weighted to place additional emphasis on the maturity of the corporation. Alternatively, investments in, for example, conservative sectors may also receive a modification. To more clearly illustrate, exemplary modifiers accounting for the size of a return and a number of revisions issued are discussed in greater detail below. These modifications are introduced for exemplary reasons only and it is to be understood that other manipulations are also possible within the scope of the present invention.

Initially, an optional upward revision adjustment may be generated to reflect and emphasize the number of revisions issued by the analyst. Specifically, a modification may be made to the conditional upward revision performance score accentuating the number of upward revisions issued by the analyst 730.

In this example, the adjustment is determined by:

$$up.rev.adj. = (-20) * \left| \frac{1}{\sqrt{\frac{\text{num\_up\_rev1}+\text{num\_up\_rev2}+\text{num\_up\_rev3}}{3}}} \right|$$

In the above formula, num_up_rev1, num_up_rev2, and num_up_rev3 correspond respectively to the number of upward revisions for a first interval, the number of upward revisions for a second interval, and the number of upward revisions for a third interval. As will be noted from the above formula, three separate upward revision numbers or values for three time intervals are considered in this embodiment.

Figure 9:
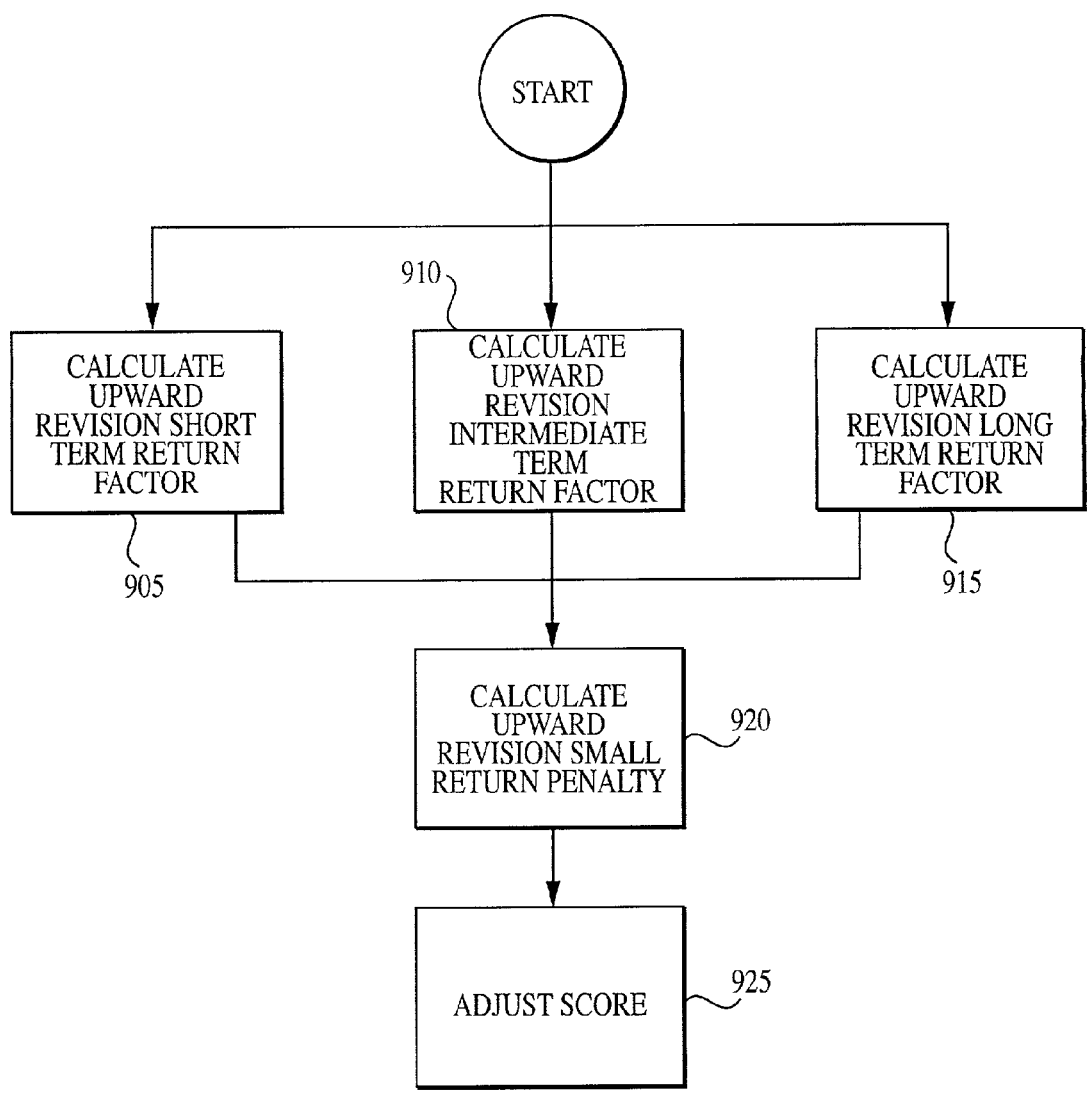
FIG. 9 is a flow diagram illustrating a process for generating an upward revision small return adjustment utilizable in the processes of FIG. 7.

As another example, an upward revision return amount adjustment may be generated to emphasize a large or small return amount after a revision forecast made by the analyst. This adjustment may be utilized to penalize an analyst for a small return, or reward an analyst for a large return. Referring to FIG. 9, one example utilizable for determining a return amount adjustment for an upward revision is illustrated. In this embodiment, the return amount adjustment includes a small return penalty for reducing the conditional performance score for returns on the investment that are less than a predetermined amount. Although any predetermined amount may be utilized, with upward revisions in this example, it is set to approximately 15%. The small return penalty is generated using an average of a number of return factors and a penalty amount. More particularly, the small return penalty is determined in one embodiment by taking a difference between an average of a short period of time return factor, an intermediate period of time return factor, and a long period of time return factor, and a penalty. Thus, each of a short period of time return factor, an intermediate period of time return factor, and a long period of time return factor are initially calculated 905, 910, and 915.

In this embodiment, subject to certain conditions discussed below, each of the period of time return factors (e.g., short, intermediate and long return factors) is equal to a cube root of a return percentage over a corresponding period of time, unless the return is greater than approximately 10 or 1000%. If the return is greater than approximately 10 or 1000%, the factor is simply set to 10 or 1000%. Thus to restate the above, if the average return for the period of time is greater than 10, then the return factor is simply set to 10. However, if the average return for a period of time is not greater than 10, the return factor is equal to:

return factor=(100*average upward revision return)$^{1/3}$

After calculating each of the return values, the optional penalty is generated 920. In this embodiment, the penalty is a difference between a predetermined amount and a return for a predetermined period of time. The predetermined period of time is optionally equal to a time corresponding to the long period of time return factor. If the average return value corresponding to the investment for the predetermined long period of time is greater than a predetermined amount, the penalty is simply set to 0. As an example, the period of time and the predetermined amount may be approximately sixty days and approximately 0.15 or 15%, respectively. Thus in this example, a penalty is calculated only if the return over a sixty day period of time is less than 15%. However, if the average return value corresponding to the investment for the long period of time is not greater than 0.15 or 15%, the penalty is equal to a product of 100 and a difference between 0.15 (or 15%) and the average return value corresponding to the investment for a sixty day period of time. In other words, if the average return value corresponding to the investment for the long period of time (e.g., sixty days) is not greater than 0.15 or 15%:

penalty=(100*(0.15−average upward revision return for the long period of time))

This penalty is then subtracted from the average of the return factors 925 (discussed above) and used to produce an optional adjustment:

adjustment=(short return factor+intermediate return factor+long return factor)/3−penalty Thus, in this example, a small return penalty is imposed for small returns (e.g., approximately 15%) over a long period of time (e.g., approximately sixty days) after a revision. Once the return factors and penalty have been determined and used to produce an adjustment, the adjustment(s) is added to the conditional performance score to produce a final upward revision performance score 735.

In the above example, adjustments reflecting the number of revisions issued by the analyst and reflecting return amounts emphasizing a small return amount are illustrated. However, as discussed above, any other modifications are also possible. For instance, modifications may be made placing a much greater emphasis on short term investments to generate an adjustment aimed at producing scores for use in formulating short term investment strategies. Or, in contrast, greater weight may be placed on returns over longer periods of time to reflect, for example, a more conservative investment strategy.

Figure 8:
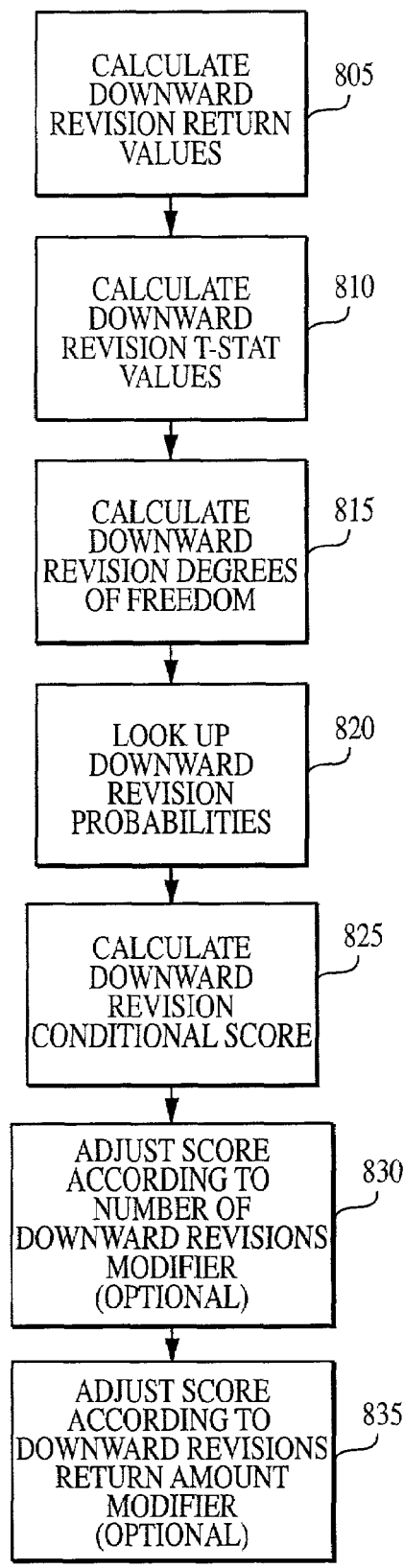
FIG. 8 is a flow diagram illustrating a high level process for generating a downward revision performance measure utilizable in the process of FIG. 6.

The generation of performance scores based on downward revisions is similar to the generation of upward revision performance scores and is depicted in FIG. 8. However, in contrast to upward revision performance scores, downward revision performance scores are indicative of an analyst's influence or accuracy in predicting the performance of, for example, a security after issuance of a downward revision. A conditional downward revision performance score may be manipulated in any number of ways to produce refined or final downward revision performance scores.

As with the upward revision scores, processing commences with the calculation or determination of one or more return values, or rates of return, for each analyst, taken a predetermined period of time after issuance of the downward revision 805. Again, any number of return values may be taken. In this particular embodiment, three return values, one for a short period of time, one for an intermediate period of time, and one for a long period of time, are taken. Furthermore, any lengths may be associated with these periods of time (e.g., a short period of time of five days, an intermediate period of twenty days, and a long period sixty days). While, three return values are utilized in this embodiment, any number of return values, at any number of time intervals, are allowed.

Subsequently, a statistical measure of confidence in the analyst's performance is calculated 810. In this case, a t-statistic (t-stat), in absolute terms, is again utilized for exemplary reasons, and is likewise calculated for each return value, subtracting, for example, one from the number of revisions for each return value 815. Hence, with three return values, three degrees of freedom are generated. Each degree of freedom is determined by:

downward revision degree of freedom=total number of downward revisions−1

Subsequently, a probability indicating, for example, the likelihood that an analyst's and/or other investing entity's actions will actually produce the expected result, is determined for each return interval 820. In this example, the degree of freedom values, along with the absolute t-stat values, are used in determining a probability for each return period. Specifically, subject to the following optional conditions, the probabilities are looked-up in a common statistics lookup table using each return interval's degree of freedom and t-stat. If any of the degrees of freedom are greater than 100, then that degree of freedom is set to 100 before looking up the probability. If any of the absolute t-stats are greater than 20, then that absolute t-stat is set to 20 before looking up the probability. Finally, if any of the t-stat are less than 0.01, then the corresponding probability is simply set to 0. Alternatively, the probabilities may be calculated based on other the methods. For example, the measures of confidence and degrees of freedom may be modified or manipulated before looking up the probability in the lookup table. Also, any other similar methods may be used in place of the look-up table to generate a probability.

Subsequent to determining the probabilities for each return period, a conditional downward revision performance score, or raw conditional downward performance score, is generated 825. Although other methods are possible, the conditional performance score in this example is determined by:

$$\text{cond\_dw\_per\_score} = \left\{ \frac{[1-(.5+\text{or}-\text{dw\_prob1})] + [1-(.5+\text{or}-\text{dw\_prob2})] + [1-(.5+\text{or}-\text{dw\_prob3})]}{3} \right\} * 100$$

Again, since three intervals are utilized in this example, three t-stat values are calculated, one for each interval.

For downward revisions, the t-stats for each return period are determined by:

$$\text{downward revision } t \text{ stat} = \left| \frac{\text{downward revision return}}{\left( \frac{\text{downward\_revision\_SD}}{\sqrt{\text{total\_number\_of\_downward\_revisions}}} \right)} \right|$$

Like with the upward revision performance score, to prevent division by zero, if the standard deviations for any of the three time intervals are zero, then the downward revision performance score for that interval is set to zero.

Again, as with the above example, it is to be understood that other measures of confidence may be substituted for the t-stat. Also, any number of modifications are possible. As indicated above, as long as an accurate reflection of the analyst's return history and/or historical consistency at issuing downward revisions is considered, any measure of confidence, for example a z-stat or other similar measurement of variability, dispersion, or consistency may be used.

After calculating the measures of confidence (e.g., the t-stats for each time interval or return period), one or more downward revision degrees of freedom are determined by In this formula, dw_prob1, dw_prob2, dw_prob3 correspond respectively to the probability for a first, second, and third return interval. Whether the probabilities are added or subtracted is determined by the following conditions. In contrast to upward revisions, if any of the three probabilities are less than zero, then that probability is subtracted from 0.5. Otherwise, 0.5 is added to the probability.

As with the above, the conditional downward revision performance score represents an initial analyst performance measure and may undergo one or more of any number of manipulations to result in various other refined performance measures and ultimately a final downward revision performance score. As examples, modifiers accounting for the size of return and the number of revisions issued are discussed in greater detail below. These modifications are introduced for exemplary reasons only and it is to be understood that other manipulations are also possible within the scope of the present invention.

For example, a downward revision adjustment may be generated to reflect and emphasize the number of revisions issued by the analyst. Specifically, a modification may be made to the conditional downward revision performance score accentuating the number of downward revisions issued by the analyst.

In this example, the adjustment is determined by:

$$dw.rev.adj. = (-20) * \left| \frac{1}{\sqrt{\frac{num\_dw\_rev1 + num\_dw\_rev2 + num\_dw\_rev3}{3}}} \right|$$

In the above formula, num_dw_rev1, num_dw_rev2, and num_dw_rev3 correspond respectively to the number of downward revisions for a first interval, the number of downward revisions for a second interval, and the number of downward revisions for a third interval. As will be noted from the above formula, three separate downward revision numbers or values for three time intervals are considered in this embodiment.

Figure 10:
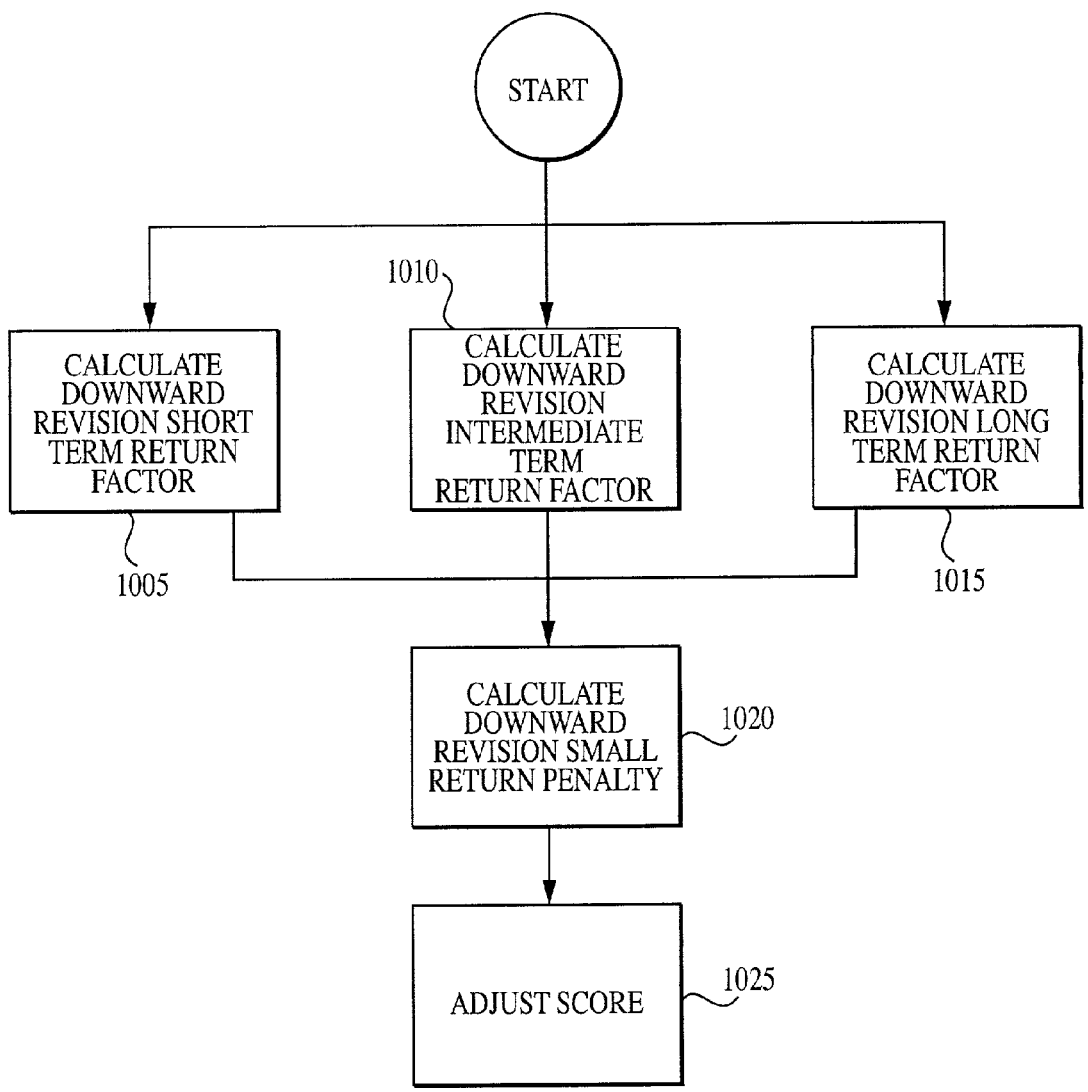
FIG. 10 is a flow diagram illustrating a process for generating a downward revision small return adjustment utilizable in the processes of FIG. 8.

As another example, a downward revision return amount adjustment may be generated to emphasize a large or small return amount after a revision forecast made by the analyst. This adjustment may be utilized to penalize an analyst for a small return, or reward an analyst for a large return. Referring to FIG. 10, one example utilizable for determining a return amount adjustment for a downward revision is illustrated. In this embodiment, the return amount adjustment includes a small return penalty for reducing the conditional performance score for returns on the investment that are less than a predetermined amount. Although any predetermined amount may be utilized, with downward revisions, in this example, it is set to approximately negative 8%. The small return penalty is generated using an average of a number of return factors and a penalty amount. More particularly, the small return penalty is determined by taking a difference between an average of a short period of time return factor, an intermediate period of time return factor, and a long period of time return factor, and a penalty. Thus, each of a short period of time return factor, an intermediate period of time return factor, and a long period of time return factor are initially calculated 1005, 1010, and 1015.

In this embodiment, subject to certain conditions discussed below, each of the period of time return factors (e.g., short, intermediate and long return factors) is equal to a cube root of a return percentage over a corresponding period of time, unless the return is greater than approximately 10 or 1000%. If the return is greater than approximately 10 or 1000%, the factor is simply set to 10 or 1000%. Thus to restate the above, if the average return for the period of time is greater than 10, then the return factor is simply set to 10. However, if the average return for a period of time is not greater than 10, the return factor is equal to:

return factor=(100*average downward revision return)$^{1/3}$

After calculating each of the return values, the penalty may be generated 1020. In this embodiment, the penalty is a difference between a predetermined amount and a return for a predetermined period of time. In this example, the predetermined period of time may be equal to a time corresponding to the long period of time return factor. If the average return value corresponding to the investment for the predetermined period of time is less than a predetermined amount, the penalty is simply set to 0. As an example, the period of time and the predetermined amount may be approximately sixty days and approximately negative 0.08 or –8%, respectively. Thus in this example, a penalty is calculated only if the return over a sixty day period of time is greater than negative 8%. However, if the average return value corresponding to the investment for the long period of time is not less than negative 0.08 or –8%, the penalty is equal to a product of 100 and a difference between negative 0.08 (or –8%) and the average return value corresponding to the investment for a sixty day period of time. In other words, if the average return value corresponding to the investment for the long period of time (e.g., sixty days) is not less than negative 0.08 or –8%:

penalty=(100*(−0.08−average downward revision return for the long period of time))

This penalty is then subtracted from the average of the return factors 1025 (discussed above) and used to produce the adjustment:

adjustment=(short return factor+intermediate return factor+long return factor)/3−penalty Thus, in this example, a small return penalty is imposed for small returns (e.g., approximately –8%) over a long period of time (e.g., approximately sixty days) after a revision. Once the return factors and penalty have been determined and used to produce an adjustment, the adjustment(s) are added to the conditional performance score to produce a final downward revision performance score 835.

Figure 11:
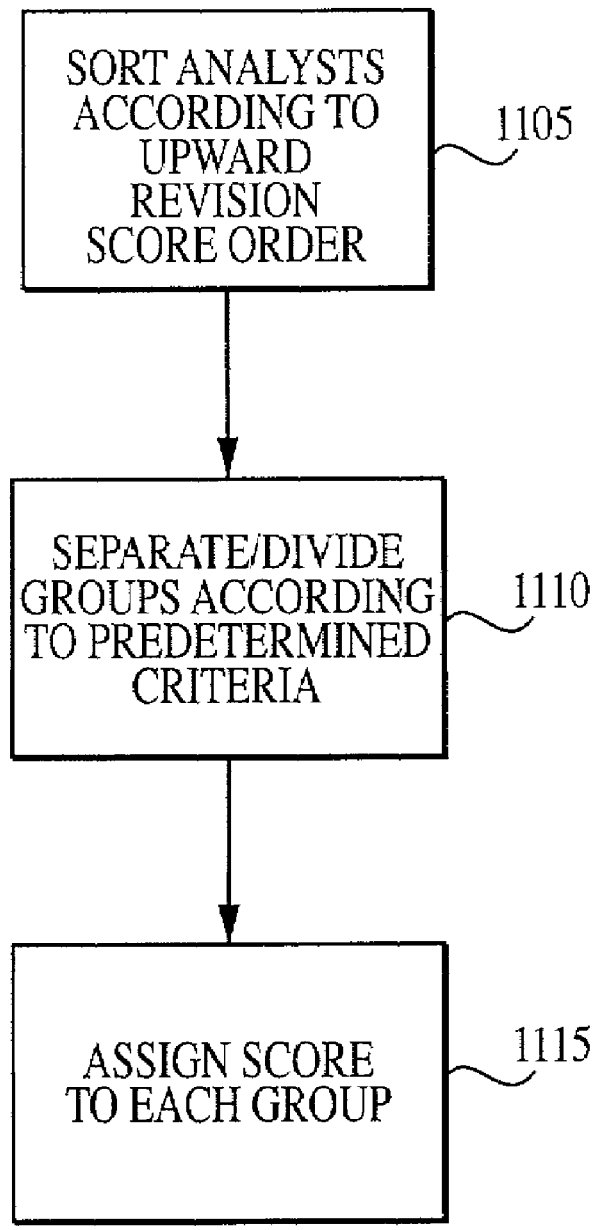
FIG. 11 is a flow diagram illustrating a process for ranking analysts according to an upward revision performance measure utilizable in the process of FIG. 7.

In accordance with the principles of the present invention, one example of a process for ranking analysts according to upward revision performance score is depicted with reference to FIG. 11. In particular, this process commences by sorting the analysts into descending (or ascending) upward revision performance score order 1105. Subsequently, as will be discussed in greater detail below, the analysts are separated into a number of groups 1110. Each group, then, is assigned a ranking 1115, with, for example, the group with the highest scores receiving a ranking of 100 (signifying the best performance) and the group with the lowest scores receiving a ranking of 0 (signifying the worst performance). Thus, each analyst receives a rank equal to his or her group.

Any method or procedure may be utilized to separate or divide the analysts into groups. In one embodiment, the analysts are simply divided to form a standard bell curve distribution. In other embodiments, other distributions are possible. As one example, the group of analysts is divided into seven groups based on upward revision performance score.

The first of these seven groups includes the top 5% of the analysts as calculated according to upward revision performance score. The analysts falling into this first group are then divided into ten substantially equally sized subgroups. The highest of these subgroups is assigned a rank of 100. The next subgroup receives a rank of 99. This process continues until the last subgroup of the top 5% group is assigned a rank of 91.

The second group includes the next 12.5% of the analysts as calculated according to upward revision performance score (e.g., 5%-12.5%). The analysts falling into the second group are then divided into fifteen substantially equally sized subgroups. The highest of these subgroups is assigned a rank of 90. The next subgroup receives a rank of 89. This process continues until the last subgroup of the second group is assigned a rank of 76.

The third group includes the next 18% of the analysts as calculated according to upward revision performance score (e.g., 12.5%-18.0%). The analysts falling into the third group are divided into fifteen substantially equally sized subgroups. The highest of these subgroups is then assigned a rank of 75. The next subgroup receives a rank of 74. This process continues until the last subgroup of the second group is assigned a rank of 61.

The fourth group includes the next 29% of the analysts as calculated according to upward revision performance score (e.g., 18%-64.5%). The analysts falling into the fourth group are divided into twenty substantially equally sized subgroups. The highest of these subgroups is then assigned a rank of 60. The next subgroup receives a rank of 59. This process continues until the last subgroup of the second group is assigned a rank of 41.

The fifth group includes the next 18% of the analysts as calculated according to upward revision performance score (e.g., 64.5%-82.5%). The analysts falling into the fifth group are then divided into fifteen substantially equally sized subgroups. The highest of these subgroups is assigned a rank of 40. The next subgroup receives a rank of 39. This process continues until the last subgroup of the second group is assigned a rank of 26.

The sixth group includes the next 12.5% of the analysts as calculated according to upward revision performance score (e.g., 82.5%-95%). The analysts falling into the sixth group are divided into fifteen substantially equally sized subgroups. The highest of these subgroups is then assigned a rank of 25. The next subgroup receives a rank of 24. This process continues until the last subgroup of the second group is assigned a rank of 11.

The seventh or last group includes the last 5% of the analysts as calculated according to upward revision performance score (e.g., 95%-100%). The analysts falling into the seventh group are then divided into ten substantially equally sized subgroups. The highest of these subgroups is then assigned a rank of 10. The next subgroup receives a rank of 9. This process continues until the last subgroup of the second group is assigned a rank of 1.

Figure 12:
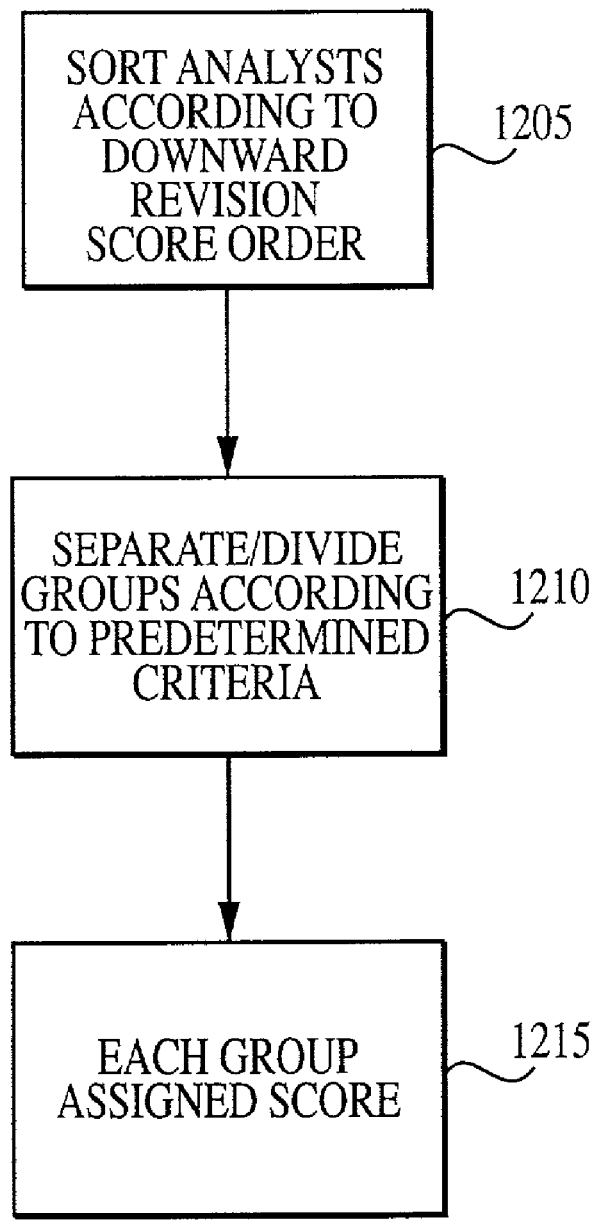
FIG. 12 is a flow diagram illustrating a process for ranking analysts according to a downward revision performance measure utilizable in the process of FIG. 8.

As depicted in FIG. 12, a similar procedure is utilized to rank the analysts with respect to downward revision performance scores. Thus this process is only briefly summarized here. Initially, the process commences by sorting the analysts into descending (or ascending) downward revision performance score order 1205. Subsequently, the analysts are separated into a number of groups 1210. Then each group is assigned a ranking 1215, with, for example, the group with the highest scores receiving a ranking of 100 (signifying the best performance) and the group with the lowest scores receiving a ranking of 0 (signifying the worst performance). Like with the upward revision scores, each analyst receives a rank equal to his or her group.

Similar to the upward revision procedure used to separate the analysts, any method may be utilized to divide these sorted analysts into groups. As one example, the group of analysts is divided into seven groups based on downward revision performance score. For instance, the first group may correspond to the top 5% and receive ranks ranging from 100-91. The second group may correspond to the next 12.5% of the analysts and receive ranks ranging from 90-76. The third group may correspond to the next 18% of the analysts and receive ranks ranging from 75-61. The fourth may correspond to the next 29% of the analysts and receive ranks ranging from 60-41. The fifth may correspond to the next 18% of the analysts and receive ranks ranging from 40-26. The sixth group may correspond to the next 12.5% of the analysts and receive ranks ranging from 25-11. The seventh or last group may correspond to the last 5% of the analysts and receive ranks ranging from 10-1.

In addition, as mentioned above, any other similar and analogous methods may be used to separate and/or divide the analysts into groups. For instance, each group may be required to include an equal number of analysts. Similarly, different criteria may be used to determine the groups.

One example depicting the tabulated results of processing in accordance with the above techniques with respect to a group of analysts covering a single company (IBM) is shown in FIG. 18. In this example, both upward and downward performance scores are listed. Also, as discussed above, the scores may be averaged or otherwise combined to yield a combined performance score. Other alternatives are also possible.

Figure 13:
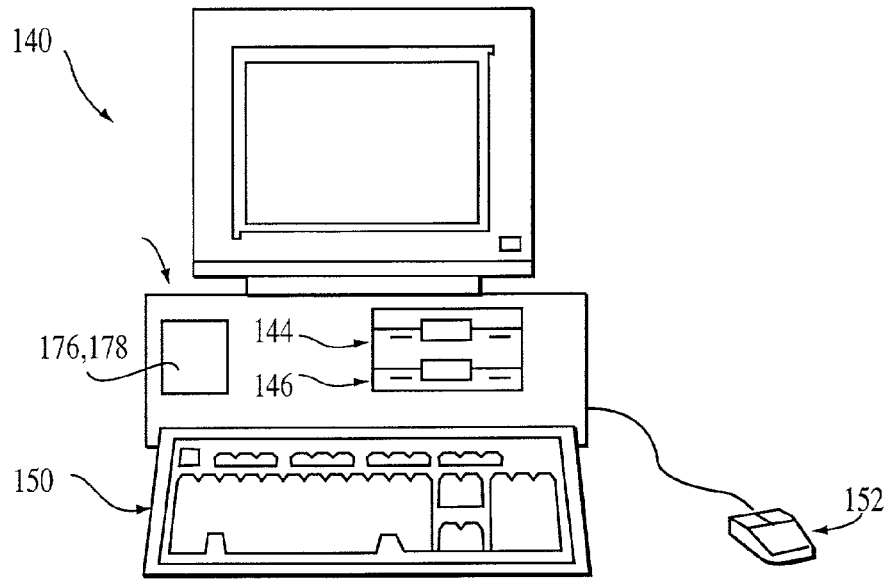
FIG. 13 illustrates one example of a central processing unit for implementing a computer process in accordance with a computer implemented embodiment of the present invention.

Viewed externally in FIG. 13, a computer system designated by reference numeral 140 has a computer 142 having disk drives 144 and 146. Disk drive indications 144 and 146 are merely symbolic of a number of disk drives which might be accommodated by the computer system. Typically, these would include a floppy disk drive 144, a hard disk drive (not shown externally) and a CD ROM indicated by slot 146. The number and type of drives vary, typically with different computer configurations. Disk drives 144 and 146 are in fact optional, and for space considerations, are easily omitted from the computer system used in conjunction with the production process/apparatus described herein.

The computer system also has an optional display upon which information, such as the screen illustrated in FIG. 5 may be displayed. In some situations, a keyboard 150 and a mouse 152 are provided as input devices through which a user's actions may be inputted, thus allowing input to interface with the central processing unit 142. Then again, for enhanced portability, the keyboard 150 is either a limited function keyboard or omitted in its entirety. In addition, mouse 152 optionally is a touch pad control device, or a track ball device, or even omitted in its entirety as well, and similarly may be used to input a user's selections. In addition, the computer system also optionally includes at least one infrared transmitter and/or infrared received for either transmitting and/or receiving infrared signals, as described below.

Figure 14:
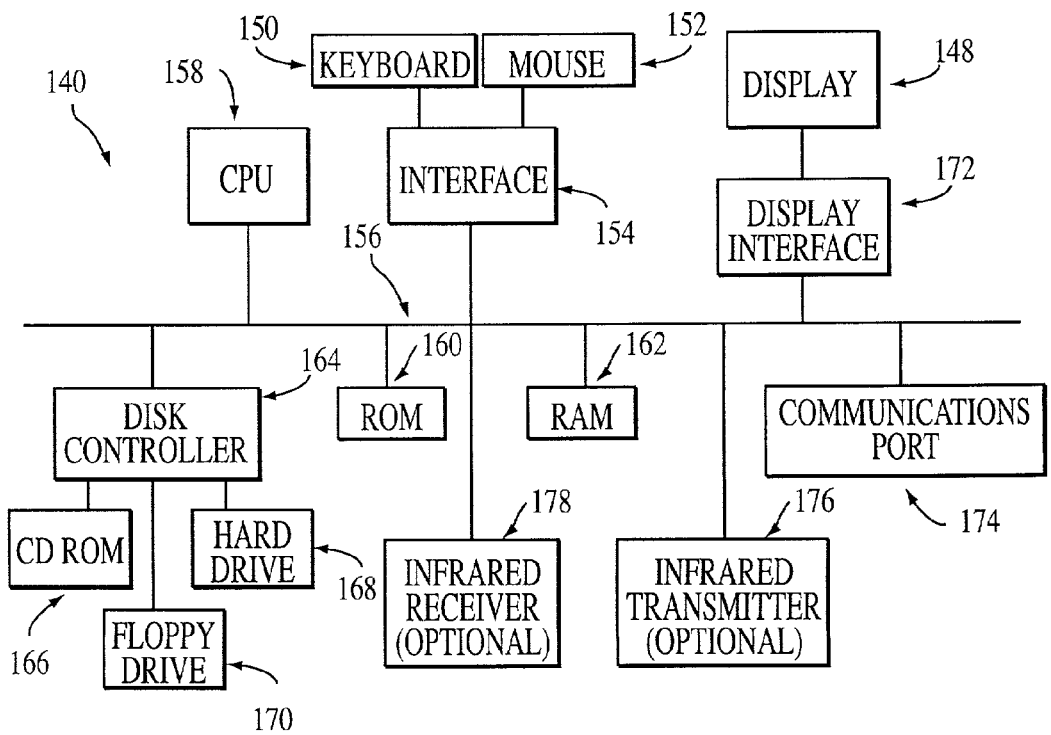
FIG. 14 illustrates one example of a block diagram of internal hardware of the central processing unit of FIG. 13.

FIG. 14 illustrates a block diagram of the internal hardware of the computer system 140 of FIG. 13. A bus 156 serves as the main information highway interconnecting the other components of the computer system 140. CPU 158 is the central processing unit of the system, performing calculations and logic operations required to execute the processes of the instant invention as well as other programs. Read only memory (ROM) 160 and random access memory (RAM) 162 constitute the main memory of the computer. Disk controller 164 interfaces one or more disk drives to the system bus 156. These disk drives are, for example, floppy disk drives such as 170, or CD ROM or DVD (digital video disks) drive such as 166, or internal or external hard drives 168. As indicated previously, these various disk drives and disk controllers are optional devices.

A display interface 172 interfaces display 148 and permits information from the bus 156 to be displayed on the display 148. Again as indicated, display 148 is also an optional accessory. For example, display 148 could be substituted or omitted. Communications with external devices, for example, the other components of the system described herein, occur utilizing communication port 174. For example, optical fibers and/or electrical cables and/or conductors and/or optical communication (e.g., infrared, and the like) and/or wireless communication (e.g., radio frequency (RF), and the like) can be used as the transport medium between the external devices and communication port 174. Peripheral interface 154 interfaces the keyboard 150 and the mouse 152, permitting input data to be transmitted to the bus 156. In addition to the standard components of the computer, the computer also optionally includes an infrared transmitter 178 and/or infrared receiver 176. Infrared transmitters are optionally utilized when the computer system is used in conjunction with one or more of the processing components/stations that transmits/receives data via infrared signal transmission. Instead of utilizing an infrared transmitter or infrared receiver, the computer system may also optionally use a low power radio transmitter 180 and/or a low power radio receiver 182 as shown in the alternate embodiment of FIG. 15. The low power radio transmitter transmits the signal for reception by components of the production process, and receives signals from the components via the low power radio receiver. The low power radio transmitter and/or receiver are standard devices in industry.

Figure 15:
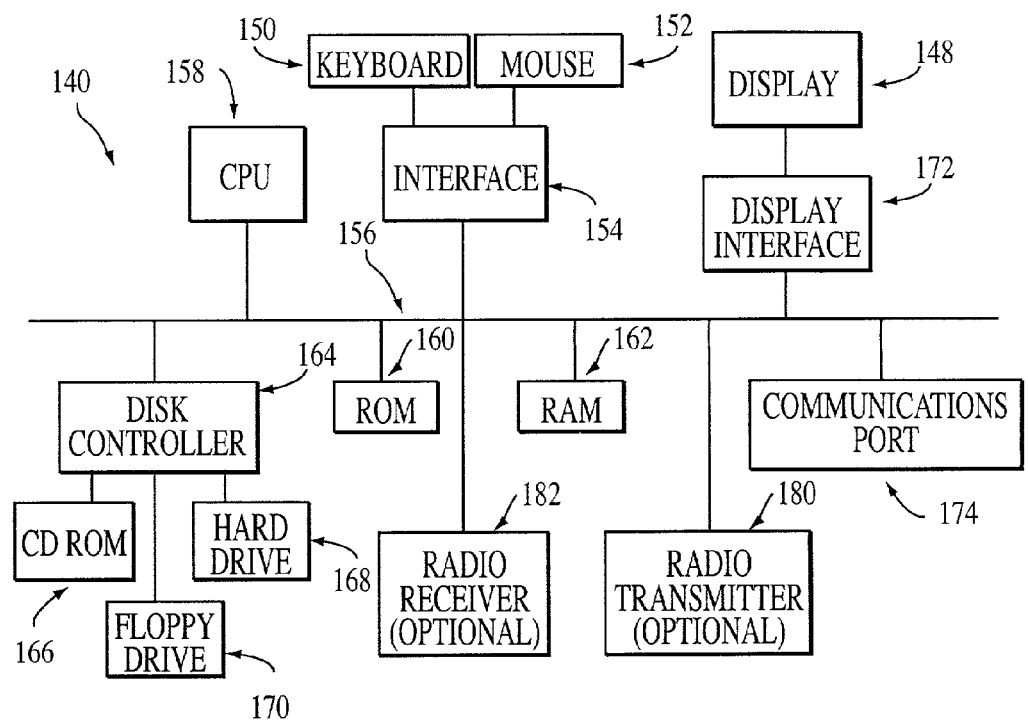
FIG. 15 illustrates another example of a block diagram of internal hardware of the central processing unit of FIG. 13.
Figure 16:
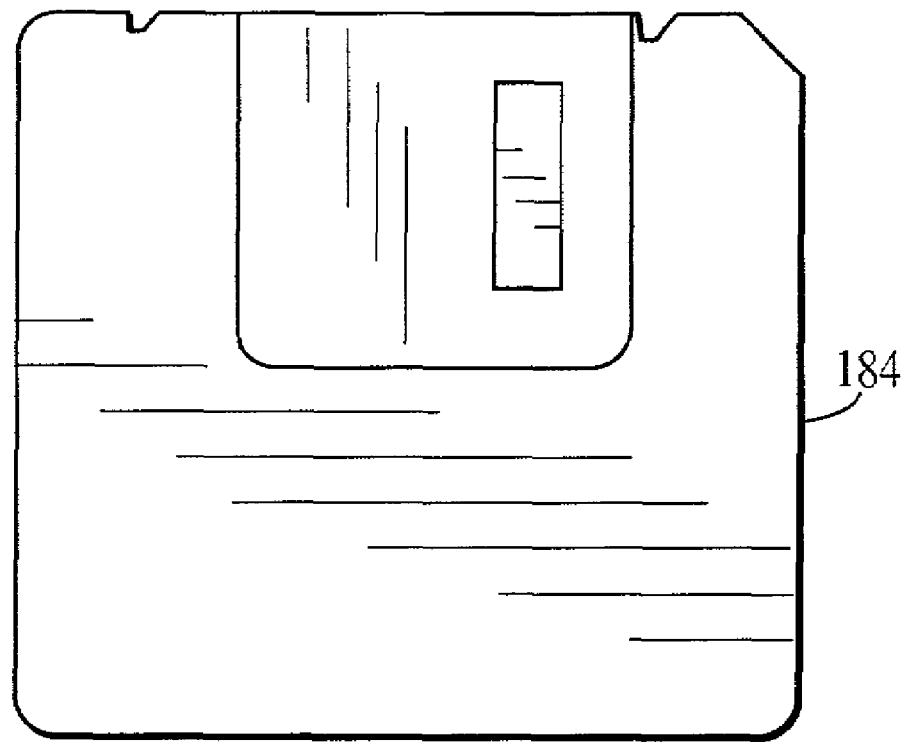
FIG. 16 illustrates one example of a memory medium which may be used for storing a computer implemented process of the present invention.

FIG. 16 is an illustration of an exemplary memory medium 184 which can be used with disk drives illustrated in FIGS. 14-15. Typically, memory media such as floppy disks, or a CD ROM, or a digital video disk will contain, for example, a multi-byte locale for a single byte language and the program information for controlling the computer to enable the computer to perform the functions described herein. Alternatively, ROM 160 and/or RAM 162 illustrated in FIGS. 14-15 can also be used to store the program information that is used to instruct the central processing unit 158 to perform the operations associated with the instant processes.

Although computer system 140 is illustrated having a single processor, a single hard disk drive and a single local memory, the system 140 is optionally suitably equipped with any multitude or combination of processors or storage devices. Computer system 140 is, in point of fact, able to be replaced by, or combined with, any suitable processing system operative in accordance with the principles of the present invention, including sophisticated calculators, and hand-held, laptop/notebook, mini, mainframe and super computers, as well as processing system network combinations of the same.

Conventional processing system architecture is more fully discussed in *Computer Organization and Architecture*, by William Stallings, MacMillan Publishing Co. (3rd ed. 1993); conventional processing system network design is more fully discussed in *Data Network Design*, by Darren L. Spohn, McGraw-Hill, Inc. (1993), and conventional data communications are more fully discussed in *Data Communications Principles*, by R. D. Gitlin, J. F. Hayes and S. B. Weinstain, Plenum Press (1992) and in *The Irwin Handbook of Telecommunications*, by James Harry Green, Irwin Professional Publishing (2nd ed. 1992). Each of the foregoing publications is incorporated herein by reference. Alternatively, the hardware configuration is, for example, arranged according to the multiple instruction multiple data (MIMD) multiprocessor format for additional computing efficiency. The details of this form of computer architecture are disclosed in greater detail in, for example, U.S. Pat. No. 5,163,131; Boxer, A., Where Buses Cannot Go, IEEE Spectrum, February 1995, pp. 41-45; and Barroso, L. A. et al., RPM: A Rapid Prototyping Engine for Multiprocessor Systems, IEEE Computer February 1995, pp. 26-34, all of which are incorporated herein by reference.

In alternate preferred embodiments, the above-identified processor, and, in particular, CPU 158, may be replaced by or combined with any other suitable processing circuits, including programmable logic devices, such as PALs (programmable array logic) and PLAs (programmable logic arrays). DSPs (digital signal processors), FPGAs (field programmable gate arrays), ASICs (application specific integrated circuits), VLSIs (very large scale integrated circuits) or the like.

Figure 17:
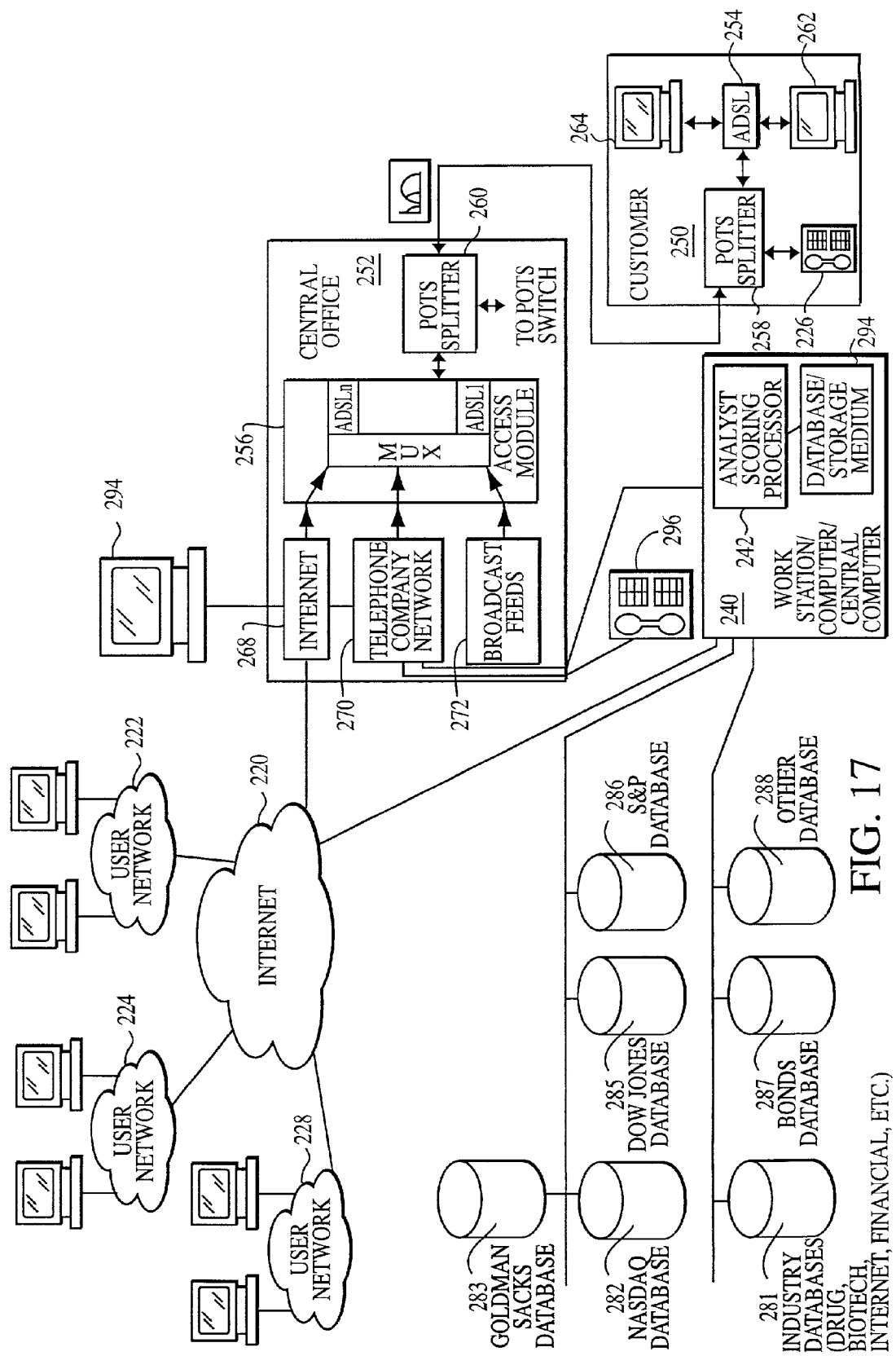
FIG. 17 illustrates an example of a combined Internet, POTS, and ADSL architecture which may be used with the present invention.

FIG. 17 is an illustration of the architecture of the combined Internet, POTS (plain, old, telephone service), and ADSL (asymmetric, digital, subscriber line) for use in accordance with the principles of the present invention. Furthermore, it is to be understood that the use of the Internet, ADSL, and POTS are for exemplary reasons only and that any suitable communications network may be substituted without departing from the principles of the present invention. This particular example is briefly discussed below.

In FIG. 17, to preserve POTS and to prevent a fault in the ADSL equipment 254, 256 from compromising analog voice traffic 226, 296, the voice part of the spectrum (the lowest 4 kHz) is separated from the rest by a passive filter, called a POTS splitter 258, 260. The rest of the available bandwidth—from about 10 kHz to 1 MHz—carries data at rates up to 6 bits per second for every hertz of bandwidth from data equipment 262, 264, and 294. The ADSL equipment 256 then has access to a number of destinations including significantly the Internet 220 or other data communications networks, and other destinations 270, 272.

To exploit the higher frequencies, ADSL makes use of advanced modulation techniques, of which the best known is the discrete multitone (DMT) technology. As its name implies, ADSL transmits data asymmetrically—at different rates upstream toward the central office 252 and downstream toward the subscriber 250.

Cable television providers are providing analogous Internet service to PC users over their TV cable systems by means of special cable modems. Such modems are capable of transmitting up to 30 Mb/s over hybrid fiber/coax system, which use fiber to bring signals to a neighborhood and coax to distribute it to individual subscribers.

Cable modems come in many forms. Most create a downstream data stream out of one of the 6-MHz TV channels that occupy spectrum above 50 MHz (and more likely 550 MHz) and carve an upstream channel out of the 5-50-MHz band, which is currently unused. Using 64-state quadrature amplitude modulation (64 QAM), a downstream channel can realistically transmit about 30 Mb/s (the oft-quoted lower speed of 10 Mb/s refers to PC rates associated with Ethernet connections). Upstream rates differ considerably from vendor to vendor, but good hybrid fiber/coax systems can deliver upstream speeds of a few megabits per second. Thus, like ADSL, cable modems transmit much more information downstream than upstream. Then Internet architecture 220 and ADSL architecture 254, 256 may also be combined with, for example, user networks 222, 224, and 228.

In accordance with the principles of the present invention, in one example, a main computing server implementing the process of the invention may be located on one computing node or terminal (e.g., on user network 222, or system 240). Then, various users may interface with the main server via, for instance, the ADSL equipment discussed above, and access the information and processes of the present invention from remotely located PCs. More specifically, a process 242 capable of performing the analyst evaluating procedure of the instant invention may be advantageously implemented in system 240. As depicted in FIG. 17, process 242 may access a list of analysts stored, for instance in data structure 294. Furthermore, although data structure 294 is shown as being stored in system 240, it may just as easily be located in a remote and distinct computer system. For example, process 242 may be implemented in such a manner as to have access to one of any number of databases 281, 282, 283, 285, 286, 287 or 288.

Furthermore, the analyst evaluating process of the present invention may also be implemented manually. For instance, it is possible to evaluate analysts by hand without the assistance of computing systems.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method of evaluating an analyst's performance comprising:
    utilizing information pertaining to at least one of an upward revision and a downward revision of an analyst's opinion of at least one investment;
    calculating a performance score indicative of the analyst's performance relative to other analysts, said performance score determined by at least one of measuring variability of the analyst's performance based on at least one of an upward revision and downward revision, averaging historical performance of the at least one investment following the at least one upward revision and downward revision, determining a number based on at least one of an upward revisions and downward revisions made by the analyst, and determining a likelihood that at least one upward revision and downward revision will actually produce an expected result;
    comparing the analyst's performance score against performance scores of other analysts to produce at least one of an upward ranking, a downward ranking, and a combined revision ranking; and
    wherein said performance score increases when a rate of return of the at least one investment increases and the revision is an upward revision, or when a rate of return of the at least one investment decreases and the revision is a downward revision, and wherein said performance score decreases when a rate of return of the at least one investment decreases and the revision is an upward revision, or when a rate of return of the at least one investment increases and the revision is a downward revision.

2. The method of claim 1, wherein determining at least one of the analyst's performance and performance score is based on at least one of three distinct periods of time comprising a short period of time which is about five days, an intermediate period of time which is about twenty days, and a long period of time which is about sixty days.

3. The method of claim 1, wherein said performance score increases with the number of revisions.

4. The method of claim 1, further comprising adjusting said performance score according to a modifier accentuating the number of revisions made by the analyst.

5. The method of claim 1, further comprising adjusting said performance score according to a return penalty.

6. The method of claim 5, wherein said return penalty is generated by subtracting a penalty from an average of a first, second and third period of time return factor; wherein for upward revisions said penalty is 0 if an average return value corresponding to the investment for a long term period of time is greater than 15%, else said penalty is equal to 15% minus said average return value corresponding to the investment for a long term period of time; wherein for downward revisions said penalty is 0 if said average return value corresponding to the investment for a long term period of time is less than −8%, else said penalty is equal to −8% minus said average return value corresponding to the investment for a long term period of time; wherein said first period of time return factor is ten if an average return over said first period of time is greater than ten, else said first period of time return factor is equal to a cube root of a product of 100 and said average return over said first period of time; wherein said second period of time return factor is ten if an average return over said second period of time is greater than ten, else said second period of time return factor is equal to a cube root of a product of 100 and said average return over said second period of time; and wherein said third period of time return factor is ten if an average return over said third period of time is greater than ten, else said third period of time return factor is equal to a cube root of a product of 100 and said average return over said third period of time.

7. The method of claim 1, wherein said calculating a performance score comprises:
    determining a first average return value (ave. return$_1$), second average return value (ave. return$_2$), and third average return value (ave. return$_3$) for the at least one revision, said first, second, and third average return values corresponding respectively to an average rate of return on the at least one revision involving the investment for a first period of time (time$_1$), a second period of time (time$_2$), and a third period of time (time$_3$);
    calculating, in absolute terms, a first t-stat value (t-stat$_1$) for said first average return value, a second t-stat value (t-stat$_2$) for said second average return value, and a third t-stat value (t-stat$_3$) for said third average return value, said first, second, and third t-stat values calculated by utilizing said first, second, and third average return values, a first standard deviation (SD$_1$), a second standard deviation (SD$_2$), and a third standard deviation (SD$_3$), a total number of revisions (revisions$_1$) occurring more than or equal to the first period of time before said evaluating, a total number of revisions (revisions$_2$) occurring more than or equal to the second period of time before said evaluating, and a total number of revisions (revisions$_3$) occurring more than or equal to the third period of time before said evaluating;
    calculating a first degree of freedom (DF$_1$) for said first average return value, a second degree of freedom (DF$_2$) for said second average return value, and a third degree of freedom (DF$_3$) for said third average return value;
    determining a first probability (prob$_1$) for said first period of time by utilizing said first t-stat value and said first degree of freedom, a second probability (prob$_2$) for said second period of time by utilizing said second t-stat value and said second degree of freedom, and a third probability (prob$_3$) for said third period of time by utilizing said third t-stat value and said third degree of freedom; and
    generating a conditional performance score (cond. performance score) for the analyst by utilizing prob$_1$, prob$_2$, and prob$_3$, which maybe manipulated to produce said performance score.

8. The method of claim 7, wherein if SD$_1$=0, then conditional performance score=0 otherwise $$Tstat_1 = \left| \frac{ave.return1}{\left( \frac{SD1}{\sqrt{revisions1}} \right)} \right|;$$

wherein if SD$_2$=0, then conditional performance score=0 otherwise $$Tstat_2 = \left| \frac{ave.return2}{\left( \frac{SD2}{\sqrt{revisions2}} \right)} \right|;$$

wherein if $SD_3=0$, then conditional performance score=0 otherwise $$Tstat_3 = \left| \frac{ave.return3}{\left(\frac{SD3}{\sqrt{revisions3}}\right)} \right|;$$

wherein $DF_1=revisions_1-1$; $DF_2=revisions_2-1$; and $DF_3=revisions_3-1$.

9. The method of claim 7, wherein said probabilities are determined according to a predetermined look-up table using actual calculated values of: $DF_1$, $DF_2$, $DF_3$, t-stat$_1$, t-stat$_2$, and t-stat$_3$, unless: $DF_1>100$, in which case $DF_1$ is set to 100; $DF_2>100$, in which case $DF_2$ is set to 100; $DF_3>100$, in which case $DF_3$ is set to 100; t-stat$_1>20$, in which case t-stat$_1$ is set to 20; tstat$_2>20$, in which case t-stat$_2$ is set to 20; t-stat$_3>20$, in which case t-stat$_3$ is set to 20; t-stat$_1<0.01$, in which case prob$_1$ is set to 0; t-stat$_2<0.01$, in which case prob$_2$ is set to 0; or t-stat$_3<0.01$, in which case prob$_3$ is set to 0.

10. The method of claim 7, wherein $$cond\_performance\_score = \left\{ \frac{[1-(.5+or-prob1)] + [1-(.5+or-prob2)] + [1-(.5+or-prob3)]}{3} \right\} * 100,$$

wherein for upward revisions prob$_1$ is subtracted from 0.5 if ave. return$_1>0$, else prob$_1$ is added to 0.5; wherein for upward revisions prob$_2$ is subtracted from 0.5 if ave. return$_2>0$, else prob$_2$ is added to 0.5; wherein for upward revisions prob$_3$ is subtracted from 0.5 if ave. return$_3>0$, else prob$_3$ is added to 0.5; wherein for downward revisions prob$_1$ is subtracted from 0.5 if ave. return, <0, else prob$_1$ is added to 0.5; wherein for downward revisions prob$_2$ is subtracted from 0.5 if ave. return$_2<0$, else prob$_2$ is added to 0.5; and wherein for downward revisions prob$_3$ is subtracted from 0.5 if ave. return$_3<0$, else prob$_3$ is added to 0.5.

11. A system for evaluating an analyst's performance, said system comprising:
a processor;
a memory storing a computer program controlling operation of said processor, said program including instructions for causing the processor to effect:
utilizing information pertaining to at least one of an upward revision and a downward revision of an analyst's opinion of at least one investment;
calculating a performance score indicative of the analyst's performance relative to other analysts, said performance score determined by at least one of measuring variability of the analyst's performance based on at least one of an upward revision and downward revision, averaging historical performance of the at least one investment following the at least one upward revision and downward revision, determining a number based on at least one of an upward revisions and downward revisions made by the analyst, and determining a likelihood that at least one upward revision and downward revision will actually produce an expected result;
comparing the analyst's performance score against performance scores of other analysts to produce at least one of an upward ranking, a downward ranking, and a combined revision ranking; and
wherein said performance score increases when a rate of return of the at least one investment increases and the revision is an upward revision, or when a rate of return of the at least one investment decreases and the revision is a downward revision, and wherein said performance score decreases when a rate of return of the at least one investment decreases and the revision is an upward revision, or when a rate of return of the at least one investment increases and the revision is a downward revision.

12. The system of claim 11, wherein said program further comprises instructions to effect adjusting said performance score according to a modifier accentuating the number of revisions made by the analyst.

13. The system of claim 11, wherein said calculating a performance score comprises:
determining a first average return value (ave. return$_1$), second average return value (ave. return$_2$), and third average return value (ave. return$_3$) for the at least one revision, said first, second, and third average return values corresponding respectively to an average rate of return on the at least one revision involving the investment for a first period of time (time$_1$), a second period of time (time$_2$), and a third period of time (time$_3$);
calculating, in absolute terms, a first t-stat value (t-stat$_1$) for said first average return value, a second t-stat value (t-stat$_2$) for said second average return value, and a third t-stat value (t-stat$_3$) for said third average return value, said first, second, and third t-stat values calculated by utilizing said first, second, and third average return values, a first standard deviation (SD$_1$), a second standard deviation (SD$_2$), and a third standard deviation (SD$_3$), a total number of revisions (revisions$_1$) occurring more than or equal to the first period of time before said evaluating, a total number of revisions (revisions$_2$) occurring more than or equal to the second period of time before said evaluating, and a total number of revisions (revisions$_3$) occurring more than or equal to the third period of time before said evaluating;
calculating a first degree of freedom (DF$_1$) for said first average return value, a second degree of freedom (DF$_2$) for said second average return value, and a third degree of freedom (DF$_3$) for said third average return value;
determining a first probability (prob$_1$) for said first period of time by utilizing said first t-stat value and said first degree of freedom, a second probability (prob$_2$) for said second period of time by utilizing said second t-stat value and said second degree of freedom, and a third probability (prob$_3$) for said third period of time by utilizing said third t-stat value and said third degree of freedom; and
generating a conditional performance score (cond. performance score) for the analyst by utilizing prob$_1$, prob$_2$, and prob$_3$, which may be manipulated to produce said performance score.

14. The system of claim 13, wherein if $SD_1=0$, then conditional performance score=0 otherwise $$Tstat_1 = \left| \frac{ave.return1}{\left(\frac{SD1}{\sqrt{revisions1}}\right)} \right|;$$

wherein if $SD_2=0$, then conditional performance score=0 otherwise $$Tstat_2 = \left| \frac{ave.return2}{\left(\frac{SD2}{\sqrt{revisions2}}\right)} \right|;$$

wherein if $SD_3=0$, then conditional performance score=0 otherwise $$Tstat_3 = \left| \frac{ave.return3}{\left(\frac{SD3}{\sqrt{revisions3}}\right)} \right|;$$

wherein $DF_1=revisions_1-1$; $DF_2=revisions_2-1$; and $DF_3=revisions_3-1$.

15. The system of claim 13, wherein said probabilities are determined according to a predetermined look-up table using actual calculated values of: $DF_1$, $DF_2$, $DF_3$, t-stat$_1$, t-stat$_2$, and t-stat$_3$, unless: $DF_1>100$, in which case $DF_1$ is set to 100; $DF_2>100$, in which case $DF_2$ is set to 100; $DF_3>100$, in which case $DF_3$ is set to 100; t-stat$_1>20$, in which case t-stat$_1$ is set to 20; tstat$_2>20$, in which case t-stat$_2$ is set to 20; t-stat$_3>20$, in which case t-stat$_3$ is set to 20; t-stat$_1<0.01$, in which case prob$_1$ is set to 0; t-stat$_2<0.01$, in which case prob$_2$ is set to 0; or t-stat$_3<0-0.1$, in which case prob$_3$ is set to 0.

16. The system of claim 13, wherein cond_performance_score =

$$\left\{ \frac{[1-(.5+or-prob1)]+[1-(.5+or-prob2)]+[1-(.5+or-prob3)]}{3} \right\} *100,$$

wherein for upward revisions prob$_1$ is subtracted from 0.5 if ave. return$_1>0$, else prob$_1$ is added to 0.5; wherein for upward revisions prob$_2$ is subtracted from 0.5 if ave. return$_2>0$, else prob$_2$ is added to 0.5; wherein for upward revisions prob$_3$ is subtracted from 0.5 if ave. return$_3>0$, else prob$_3$ is added to 0.5; wherein for downward revisions prob$_1$ is subtracted from 0.5 if ave. return$_1<0$, else prob$_1$ is added to 0.5; wherein for downward revisions prob$_2$ is subtracted from 0.5 if ave. return$_2<0$, else prob$_2$ is added to 0.5; and wherein for downward revisions prob$_3$ is subtracted from 0.5 if ave. return$_3<0$, else prob$_3$ is added to 0.5.

17. A system for evaluating an analyst's performance, said system comprising:

means for utilizing information pertaining to at least one of an upward revision and a downward revision of an analyst's opinion of at least one investment;

means for calculating a performance score indicative of the analyst's performance relative to other analysts, said performance score determined by at least one of measuring variability of the analyst's performance based on at least one of an upward revision and downward revision, averaging historical performance of the at least one investment following the at least one upward revision and downward revision, determining a number based on at least one of an upward revisions and downward revisions made by the analyst, and determining a likelihood that at least one upward revision and downward revision, will actually produce an expected result;

means for comparing the analyst's performance score against performance scores of other analysts to produce at least one of an upward ranking, a downward ranking, and a combined revision ranking; and wherein said performance score increases when a rate of return of the at least one investment increases and the revision is an upward revision, or when a rate of return of the at least one investment decreases and the revision is a downward revision, and wherein said performance score decreases when a rate of return of the at least one investment decreases and the revision is an upward revision, or when a rate of return of the at least one investment increases and the revision is a downward revision.

18. The system of claim 17, further comprising means for adjusting said performance score according to a modifier accentuating the number of revisions made by the analyst.

19. The system of claim 17, wherein said calculating a performance score comprises:

determining a first average return value (ave. return$_1$), second average return value (ave. return$_2$), and third average return value (ave. return$_3$) for the at least one revision, said first, second, and third average return values corresponding respectively to an average rate of return on the at least one revision involving the investment for a first period of time (time$_1$), a second period of time (time$_2$), and a third period of time (time$_3$);

calculating, in absolute terms, a first t-stat value (t-stat$_1$) for said first average return value, a second t-stat value (t-stat$_2$) for said second average return value, and a third t-stat value (t-stat$_3$) for said third average return value, said first, second, and third t-stat values calculated by utilizing said first, second, and third average return values, a first standard deviation (SD$_1$), a second standard deviation (SD$_2$), and a third standard deviation (SD$_3$), a total number of revisions (revisions$_1$) occurring more than or equal to the first period of time before said evaluating, a total number of revisions (revisions$_2$) occurring more than or equal to the second period of time before said evaluating, and a total number of revisions (revisions$_3$) occurring more than or equal to the third period of time before said evaluating;

calculating a first degree of freedom (DF$_1$) for said first average return value, a second degree of freedom (DF$_2$) for said second average return value, and a third degree of freedom (DF$_3$) for said third average return value;

determining a first probability (prob$_1$) for said first period of time by utilizing said first t-stat value and said first degree of freedom, a second probability (prob$_2$) for said second period of time by utilizing said second t-stat value and said second degree of freedom, and a third probability (prob$_3$) for said third period of time by utilizing said third t-stat value and said third degree of freedom; and generating a conditional performance score (cond. performance score) for the analyst by utilizing prob$_1$, prob$_2$, and prob$_3$, which may be manipulated to produce said performance score.

20. The system off claim 19, wherein if $SD_1=0$, then conditional performance score=0 otherwise $$Tstat_1 = \left| \frac{ave.return1}{\left(\frac{SD1}{\sqrt{revisions1}}\right)} \right|;$$

wherein if $SD_2=0$, then conditional performance score=0 otherwise $$Tstat_2 = \left| \frac{ave.return2}{\left(\frac{SD2}{\sqrt{revisions2}}\right)} \right|;$$

wherein if $SD_3=0$, then conditional performance score=0 otherwise $$Tstat_3 = \left| \frac{ave.return3}{\left(\frac{SD3}{\sqrt{revisions3}}\right)} \right|;$$

wherein $DF_1$=revisions$_1$−1; $DF_2$=revisions$_2$−1; and $DF_3$=revisions$_3$−1.

21. The system of claim 19, wherein said probabilities are determined according to a predetermined look-up table using actual calculated values of: $DF_1$, $DF_2$, $DF_3$, t-Stat$_1$, t-stat$_2$, and t-stat$_3$, unless: $DF_1$>100, in which case $DF_1$, is set to 100; $DF_2$>100, in which case $DF_2$ is set to 100; $DF_3$>100, in which case $DF_3$ is set to 100; t-stat$_1$>20, in which case t-stat$_1$ is set to 20; tstat$_2$>20, in which case t-stat$_2$ is set to 20; t-stat$_3$>20, in which case t-stat$_3$ is set to 20; t-stat$_1$<0.01, in which case prob$_1$ is set to 0; t-stat$_2$<0.01, in which case prob$_2$ is set to 0; or t-stat$_3$<0.01, in which case prob$_3$ is set to 0.

22. The system of claim 19, wherein cond_performance_score =

$$\left\{ \frac{[1-(.5+or-prob1)]+[1-(.5+or-prob2)]+}{3} \right\} *100,$$

wherein for upward revisions prob$_1$ is subtracted from 0.5 if ave. return$_1$>0, else prob$_1$ is added to 0.5; wherein for upward revisions prob$_2$ is subtracted from 0.5 if ave. return$_2$>0, else prob$_2$ is added to 0.5; wherein for upward revisions prob$_3$ is subtracted from 0.5 if ave. return$_3$>0, else prob$_3$ is added to 0.5; wherein for downward revisions prob$_1$ is subtracted from 0.5 if ave. return$_1$1<0, else prob$_1$ is added to 0.5; wherein for downward revisions probe is subtracted from 0.5 if ave. return$_2$<0, else prob$_2$ is added to 0.5; and wherein for downward revisions prob$_3$ is subtracted from 0.5 if ave. return$_3$<0, else prob$_3$ is added to 0.5.

23. A computer readable medium storing instructions executable by a computer, the instructions for instructing the computer to effect evaluating an analyst's performance, said instructions comprising:

utilizing information pertaining to at least one of an upward revision and a downward revision of an analyst's opinion of at least one investment;

calculating a performance score indicative of the analyst's performance relative to other analysts, said performance score determined by at least one of measuring variability of the analyst's performance based on at least one of an upward revision and downward revision, averaging historical performance of the at least one investment following the at least one upward revision and downward revision, determining a number based on at least one of an upward revisions and downward revisions made by the analyst, and determining a likelihood that at least one upward revision and downward revision will actually produce an expected result;

comparing the analyst's performance score against performance scores of other analysts to produce at least one of an upward ranking, a downward ranking, and a combined revision ranking; and wherein said calculating a performance score comprises:

determining a first average return value (ave. return$_1$), second average return value (ave. return$_2$), and third average return value (ave. return$_3$) for the at least one revision, said first, second, and third average return values corresponding respectively to an average rate of return on the at least one revision involving the investment for a first period of time (time$_1$), a second period of time (time$_2$), and a third period of time (time$_3$);

calculating, in absolute terms, a first t-stat value (t-stat$_1$) for said first average return value, a second t-stat value (t-stat$_2$) for said second average return value, and a third t-stat value (t-stat$_3$) for said third average return value, said first, second, and third t-stat values calculated by utilizing said first, second, and third average return values, a first standard deviation (SD$_1$), a second standard deviation (SD$_2$), and a, third standard deviation (SD$_3$), a total number of revisions (revisions$_1$) occurring more than or equal to the first period of time before said evaluating, a total number of revisions (revisions$_2$) occurring more than or equal to the second period of time before said evaluating, and a total number of revisions (revisions$_3$) occurring more than or equal to the third period of time before said evaluating;

calculating a first degree of freedom (DF$_1$) for said first average return value, a second degree of freedom (DF$_2$) for said second average return value, and a third degree of freedom (DF$_3$) for said third average return value;

determining a first probability (prob$_1$) for said first period of time by utilizing said first t-stat value and said first degree of freedom, a second probability (prob$_2$) for said second period of time by utilizing said second t-stat value and said second degree of freedom, and a third probability (prob$_3$) for said third period of time by utilizing said third t-stat value and said third degree of freedom; and generating a conditional performance score (cond. performance score) for the analyst by utilizing prob$_1$, prob$_2$, and prob$_3$, which may be manipulated to produce said performance score.

24. The computer readable medium of claim 23, further comprising adjusting said performance score according to a modifier accentuating the number of revisions made by the analyst.

25. A method of evaluating an analyst's performance, said method comprising:

a step for utilizing information pertaining to at least one of an upward revision and a downward revision of an analyst's opinion of at least one investment;

a step for calculating a performance score indicative of the analyst's performance relative to other analysts, said performance score determined by at least one of measuring variability of the analyst's performance based on at least one of an upward revision and downward revision, averaging historical performance of the at least one investment following the at least one upward revision and downward revision, , determining a number based on at least one of an upward revisions and downward revisions made by the analyst and determining a likelihood that at least one upward revision and downward revision will actually produce an expected result;

a step for comparing the analyst's performance score against performance scores of other analysts to produce at least one of an upward ranking, a downward ranking, and a combined revision ranking; and wherein said performance score increases when a rate of return of the at least one investment increases and the revision is an upward revision, or when a rate of return of the at least one investment decreases and the revision is a downward revision, and wherein said performance score decreases when a rate of return of the at least one investment decreases and the revision is an upward revision, or when a rate of return of the at least one investment increases and the revision is a downward revision.

26. The system of claim 11, wherein calculating a performance score further comprises determining a standard deviation based on at least one upward revision and downward revision.

27. The system of claim 17, wherein means for calculating a performance score further comprises determining a standard deviation based on at least one upward revision and downward revision.

28. The computer readable medium storing instructions of claim 23, wherein calculating a performance score further comprises determining a standard deviation based on at least one upward revision and downward revision.

29. The method of claim 25, wherein calculating a performance score further comprises determining a standard deviation based on at least one upward revision and downward revision.

30. A method of evaluating an analyst's performance comprising:

utilizing information pertaining to at least one of an upward revision and a downward revision of an analyst's opinion of at least one investment;

calculating a performance score indicative of the analyst's performance relative to other analysts, said performance score determined by at least one of measuring variability of the analyst's performance based on at least one of an upward revision and downward revision, averaging historical performance of the at least one investment following the at least one upward revision and downward revision, determining a number based on at least one of an upward revisions and downward revisions made by the analyst, and determining a likelihood that at least one upward revision and downward revision will actually produce an expected result;

comparing the analyst's performance score against performance scores of other analysts to produce at least one of an upward ranking, a downward ranking, and a combined revision ranking; and wherein said calculating a performance score comprises:

determining a first average return value (ave. return$_1$), second average return value (ave. return$_2$), and third average return value (ave. return$_3$) for the at least one revision, said first, second, and third average return values corresponding respectively to an average rate of return on the at least one revision involving the investment for a first period of time (time$_1$), a second period of time (time$_2$), and a third period of time (time$_3$);

calculating, in absolute terms, a first t-stat value (t-stat$_1$) for said first average return value, a second t-stat value (t-stat$_2$) for said second average return value, and a third t-stat value (t-stat$_3$) for said third average return value, said first, second, and third t-stat values calculated by utilizing said first, second, and third average return values, a first standard deviation (SD$_1$), a second standard deviation (SD$_2$), and a third standard deviation (SD$_3$), a total number of revisions (revisions$_1$) occurring more than or equal to the first period of time before said evaluating, a total number of revisions (revisions$_2$) occurring more than or equal to the second period of time before said evaluating, and a total number of revisions (revisions$_3$) occurring more than or equal to the third period of time before said evaluating;

calculating a first degree of freedom (DF$_1$) for said first average return value, a second degree of freedom (DF$_2$) for said second average return value, and a third degree of freedom (DF$_3$) for said third average return value;

determining a first probability (prob$_1$) for said first period of time by utilizing said first t-stat value and said first degree of freedom, a second probability (prob$_2$) for said second period of time by utilizing said second t-stat value and said second degree of freedom, and a third probability (prob$_3$) for said third period of time by utilizing said third t-stat value and said third degree of freedom; and generating a conditional performance score (cond. performance score) for the analyst by utilizing prob$_1$, prob$_2$, and prob$_3$, which may be manipulated to produce said performance score.

31. The method of claim 30, wherein if SD$_1$=0, then conditional performance score=0 otherwise $$Tstat_1 = \left| \frac{ave.return1}{\left(\frac{SD1}{\sqrt{revisions1}}\right)} \right|;$$

wherein if SD$_2$,=0, then conditional performance score=0 otherwise $$Tstat_2 = \left| \frac{ave.return2}{\left(\frac{SD2}{\sqrt{revisions2}}\right)} \right|;$$

wherein if SD$_3$,=0, then conditional performance score=0 otherwise $$Tstat_3 = \left| \frac{ave.return3}{\left(\frac{SD3}{\sqrt{revisions3}}\right)} \right|;$$

wherein DF$_1$=revisions$_1$−1; DF$_2$=revisions$_2$−1; and DF$_3$=revisions$_3$1.

32. The method of claim 30, wherein said probabilities are determined according to a predetermined look-up table using actual calculated values of: DF$_1$, DF$_2$, DF$_3$, t-stat$_1$, t-stat$_2$, and t-stat$_3$, unless: DF$_1$>100, in which case DF$_1$ is set to 100; DF$_2$>100, in which case DF$_2$ is set to 100; DF$_3$>100, in which case DF$_3$ is set to 100; t-stat$_1$>20, in which case t-stat$_1$ is set to 20; tstat$_2$>20, in which case t-stat$_2$ is set to 20; t-stat$_3$>20, in which case t-stat$_3$ is set to 20; t-stat$_1$<0.01, in which case prob$_1$ is set to 0; t-stat$_2$<0.01, in which case prob$_2$ is set to 0; or t-stat$_3$<0.01, in which case prob$_3$ is set to 0.

33. The method of claim 30, wherein $$\text{cond\_performance\_score} = \left\{ \frac{[1-(.5+\text{or}-prob1)]+[1-(.5+\text{or}-prob2)]+[1-(.5+\text{or}-prob3)]}{3} \right\} *100,$$

wherein for upward revisions $prob_1$ is subtracted from 0.5 if ave. return$_1$>0, else $prob_1$ is added to 0.5; wherein for upward revisions $prob_2$ is subtracted from 0.5 if ave. return$_2$>0, else $prob_2$ is added to 0.5; wherein for upward revisions $prob_3$ is subtracted from 0.5 if ave. return$_3$>0, else $prob_3$ is added to 0.5; wherein for downward revisions $prob_1$ is subtracted from 0.5 if ave. return, <0, else $prob_1$ is added to 0.5; wherein for downward revisions $prob_2$ is subtracted from 0.5 if ave. return$_2$<0, else $prob_2$ is added to 0.5; and wherein for downward revisions $prob_3$ is subtracted from 0.5 if ave. return$_3$<0, else $prob_3$ is added to 0.5.

34. A system for evaluating an analyst's performance, said system comprising:
   a processor;
   a memory storing a computer program controlling operation of said processor, said program including instructions for causing the processor to effect;
   utilizing information pertaining to at least one of an upward revision and a downward revision of an analyst's opinion of at least one investment;
   calculating a performance score indicative of the analyst's performance relative to other analysts, said performance score determined by at least one of measuring variability of the analyst's performance based on at least one of an upward revision and downward revision, averaging historical performance of the at least one investment following the at least one upward revision and downward revision, determining a number based on at least one of an upward revisions and downward revisions made by the analyst, and determining a likelihood that at least one upward revision and downward revision will actually produce an expected result;
   comparing the analyst's performance score against performance scores of other analysts to produce at least one of an upward ranking, a downward ranking, and a combined revision ranking; and
   wherein said calculating a performance score comprises:
   determining a first average return value (ave. return$_1$), second average return value (ave. return$_2$), and third average return value (ave. return$_3$) for the at least one revision, said first, second, and third average return values corresponding respectively to an average rate of return on the at least one revision involving the investment for a first period of time (time$_1$), a second period of time (time$_2$), and a third period of time (time$_3$);
   calculating, in absolute terms, a first t-stat value (t-stat$_1$) for said first average return value, a second t-stat value (t-stat$_2$) for said second average return value, and a third t-stat value (t-stat$_3$) for said third average return value, said first, second, and third t-stat values calculated by utilizing said first, second, and third average return values, a first standard deviation (SD$_1$), a second standard deviation (SD$_2$), and a third standard deviation (SD$_3$), a total number of revisions (revisions$_1$) occurring more than or equal to the first period of time before said evaluating, a total number of revisions (revisions$_2$) occurring more than or equal to the second period of time before said evaluating, and a total number of revisions (revisions$_3$) occurring more than or equal to the third period of time before said evaluating;
   calculating a first degree of freedom (DF$_1$) for said first average return value, a second degree of freedom (DF$_2$) for said second average return value, and a third degree of freedom (DF$_3$) for said third average return value;
   determining a first probability (prob$_1$) for said first period of time by utilizing said first t-stat value and said first degree of freedom, a second probability (prob$_2$) for said second period of time by utilizing said second t-stat value and said second degree of freedom, and a third probability (prob$_3$) for said third period of time by utilizing said third t-stat value and said third degree of freedom; and
   generating a conditional performance score (cond. performance score) for the analyst by utilizing prob$_1$, prob$_2$, and prob$_3$, which may be manipulated to produce said performance score.

35. The system of claim 34, wherein if SD$_1$=0, then conditional performance score=0 otherwise $$Tstat_1 = \left| \frac{ave.return1}{\left(\frac{SD1}{\sqrt{revisions1}}\right)} \right|;$$

wherein if SD$_2$,=0, then conditional performance score=0 otherwise $$Tstat_2 = \left| \frac{ave.return2}{\left(\frac{SD2}{\sqrt{revisions2}}\right)} \right|;$$

wherein if SD$_3$,=0, then conditional performance score=0 otherwise $$Tstat_3 = \left| \frac{ave.return3}{\left(\frac{SD3}{\sqrt{revisions3}}\right)} \right|;$$

wherein DF$_1$=revisions$_1$-1; DF$_2$=revisions$_2$-1; and DF$_3$=revisions$_3$-1.

36. The system of claim 34, wherein $$\text{cond\_performance\_score} = \left\{ \frac{[1-(.5+\text{or}-prob1)]+[1-(.5+\text{or}-prob2)]+[1-(.5+\text{or}-prob3)]}{3} \right\} *100,$$

wherein for upward revisions $prob_1$ is subtracted from 0.5 if ave. return$_1$>0, else $prob_1$ is added to 0.5; wherein for upward revisions $prob_2$ is subtracted from 0.5 if ave. return$_2$>0, else $prob_2$ is added to 0.5; wherein for upward revisions $prob_3$ is subtracted from 0.5 if ave. return$_3$>0, else $prob_3$ is added to 0.5; wherein for downward revisions $prob_1$ is subtracted from 0.5 if ave. return$_1$<0, else $prob_1$ is added to 0.5; wherein for downward revisions $prob_2$ is subtracted from 0.5 if ave. return$_2$<0, else $prob_2$ is added to 0.5; and wherein for downward revisions $prob_3$ is subtracted from 0.5 if ave. return$_3$<0, else $prob_3$ is added to 0.5.

37. A system for evaluating an analyst's performance, said system comprising:
- means for utilizing information pertaining to at least one of an upward revision and a downward revision of an analyst's opinion of at least one investment;
- means for calculating a performance score indicative of the analyst's performance relative to other analysts, said performance score determined by at least one of measuring variability of the analyst's performance based on at least one of an upward revision and downward revision, averaging historical performance of the at least one investment following the at least one upward revision and downward revision, determining a number based on at least one of an upward revisions and downward revisions made by the analyst, and determining a likelihood that at least one upward revision and downward revision will actually produce an expected result;
- means for comparing the analyst's performance score against performance scores of other analysts to produce at least one of an upward ranking, a downward ranking, and a combined revision ranking; and wherein said calculating a performance score comprises:
- determining a first average return value (ave. return$_1$), second average return value (ave. return$_2$), and third average return value (ave. return$_3$) for the at least one revision, said first, second, and third average return values corresponding respectively to an average rate of return on the at least one revision involving the investment for a first period of time (time$_1$), a second period of time (time$_2$), and a third period of time (time$_3$);
- calculating, in absolute terms, a first t-stat value (t-stat$_1$) for said first average return value, a second t-stat value (t-stat$_2$) for said second average return value, and a third t-stat value (t-stat$_3$) for said third average return value, said first, second, and third t-stat values calculated by utilizing said first, second, and third average return values, a first standard deviation (SD$_1$), a second standard deviation (SD$_2$), and a third standard deviation (SD$_3$), a total number of revisions (revisions$_1$) occurring more than or equal to the first period of time before said evaluating, a total number of revisions (revisions$_2$) occurring more than or equal to the second period of time before said evaluating, and a total number of revisions (revisions$_3$) occurring more than or equal to the third period of time before said evaluating;
- calculating a first degree of freedom (DF$_1$) for said first average return value, a second degree of freedom (DF$_2$) for said second average return value, and a third degree of freedom (DF$_3$) for said third average return value;
- determining a first probability (prob$_1$) for said first period of time by utilizing said first t-stat value and said first degree of freedom, a second probability (prob$_2$) for said second period of time by utilizing said second t-stat value and said second degree of freedom, and a third probability (prob$_3$) for said third period of time by utilizing said third t-stat value and said third degree of freedom; and
- generating a conditional performance score (cond. performance score) for the analyst by utilizing prob$_1$, prob$_2$, and prob$_3$, which may be manipulated to produce said performance score.

38. The system off claim 37, wherein if SD$_1$=0, then conditional performance score=0 otherwise $$Tstat_1 = \left| \frac{ave.return1}{\left(\frac{SD1}{\sqrt{revisions1}}\right)} \right|;$$

wherein if SD$_2$,=0, then conditional performance score=0 otherwise $$Tstat_2 = \left| \frac{ave.return2}{\left(\frac{SD2}{\sqrt{revisions2}}\right)} \right|;$$

wherein if SD$_3$,=0, then conditional performance score=0 otherwise $$Tstat_3 = \left| \frac{ave.return3}{\left(\frac{SD3}{\sqrt{revisions3}}\right)} \right|;$$

wherein DF$_1$=revisions$_1$−1; DF$_2$=revisions$_2$−1; and DF$_3$=revisions$_3$−1.

39. The system of claim 37, wherein said probabilities are determined according to a predetermined look-up table using actual calculated values of: DF$_1$, DF$_2$, DF$_3$, t-stat$_1$, t-stat$_2$, and t-stat$_3$, unless: DF$_1$>100, in which case DF$_1$, is set to 100; DF$_2$>100, in which case DF$_2$ is set to 100; DF$_3$>100, in which case DF$_3$ is set to 100; t-stat$_1$>20, in which case t-stat$_1$ is set to 20; tstat$_2$>20, in which case t-stat$_2$ is set to 20; t-stat$_3$>20, in which case t-stat$_3$ is set to 20; t-stat$_1$<0.01, in which case prob$_1$ is set to 0; t-stat$_2$<0.01, in which case prob$_2$ is set to 0; or t-stat$_3$<0.01, in which case prob$_3$ is set to 0.

40. The system of claim 37, wherein $$\text{cond\_performance\_score} = \left\{ \frac{[1-(.5+or-prob1)]+[1-(.5+or-prob2)]+[1-(.5+or-prob3)]}{3} \right\} * 100,$$

wherein for upward revisions prob$_1$ is subtracted from 0.5 if ave. return$_1$>0, else prob$_1$ is added to 0.5; wherein for upward revisions prob$_2$ is subtracted from 0.5 if ave. return$_2$>0, else prob$_2$ is added to 0.5; wherein for upward revisions prob$_3$ is subtracted from 0.5 if ave. return$_3$>0, else prob$_3$ is added to 0.5; wherein for downward revisions prob$_1$ is subtracted from 0.5 if ave. return$_1$1<0, else prob$_1$ is added to 0.5; wherein for downward revisions probe is subtracted from 0.5 if ave. return$_2$<0, else prob$_2$ is added to 0.5; and wherein for downward revisions prob$_3$ is subtracted from 0.5 if ave. return$_3$<0, else prob$_3$ is added to 0.5.

41. A method of evaluating an analyst's performance, said method comprising:
- a step for utilizing information pertaining to at least one of an upward revision and a downward revision of an analyst's opinion of at least one investment;
- a step for calculating a performance score indicative of the analyst's performance relative to other analysts, said performance score determined by at least one of measuring variability of the analyst's performance based on at least one of an upward revision and downward revision, averaging historical performance of the at least one investment following the at least one upward revision and downward revision, determining a number based on at least one of an upward revisions and downward revisions made by the analyst, and determining a likelihood that at least one upward revision and downward revision will actually produce an expected result;
- a step for comparing the analyst's performance score against performance scores of other analysts to produce at least one of an upward ranking, a downward ranking, and a combined revision ranking; and wherein said calculating a performance score comprises:

determining a first average return value (ave. return$_1$), second average return value (ave. return$_2$), and third average return value (ave. return$_3$) for the at least one revision, said first second, and third average return values corresponding respectively to an average rate of return on the at least one revision involving the investment for a first period of time (time$_1$), a second period of time (time$_2$), and a third period of time (time$_3$);

calculating, in absolute terms, a first t-stat value (t-stat$_1$) for said first average return value, a second t-stat value (t-stat$_2$) for said second average return value, and a third t-stat value (t-stat$_3$) for said third average return value, said first, second, and third t-stat values calculated by utilizing said first, second, and third average return values, a first standard deviation (SD$_1$), a second standard deviation (SD$_2$), and a third standard deviation (SD$_3$), a total number of revisions (revisions$_1$) occurring more than or equal to the first period of time before said evaluating, a total number of revisions (revisions$_2$) occurring more than or equal to the second period of time before said evaluating, and a total number of revisions (revisions$_3$) occurring more than or equal to the third period of time before said evaluating;

calculating a first degree of freedom (DF$_1$) for said first average return value, a second degree of freedom (DF$_2$) for said second average return value, and a third degree of freedom (DF$_3$) for said third average return value;

determining a first probability (prob$_1$) for said first period of time by utilizing said first t-stat value and said first degree of freedom, a second probability (prob$_2$) for said second period of time by utilizing said second t-stat value and said second degree of freedom, and a third probability (prob$_3$) for said third period of time by utilizing said third t-stat value and said third degree of freedom; and generating a conditional performance score (cond. performance score) for the analyst by utilizing prob$_1$, prob$_2$, and prob$_3$, which may be manipulated to produce said performance score.

42. The method of claim 41, wherein if SD$_1$=0, then conditional performance score=0 otherwise $$Tstat_1 = \left| \frac{ave.return1}{\left(\frac{SD1}{\sqrt{revisions1}}\right)} \right|;$$

wherein if SD$_2$=0, then conditional performance score=0 otherwise $$Tstat_2 = \left| \frac{ave.return2}{\left(\frac{SD2}{\sqrt{revisions2}}\right)} \right|;$$

wherein if SD$_3$=0, then conditional performance score=0 otherwise $$Tstat_3 = \left| \frac{ave.return3}{\left(\frac{SD3}{\sqrt{revisions3}}\right)} \right|;$$

wherein DF$_1$=revisions$_1$−1; DF$_2$=revisions$_2$−1; and DF$_3$=revisions$_3$−1.

43. The method of claim 41, wherein said probabilities are determined according to a predetermined look-up table using actual calculated values of: DF$_1$, DF$_2$, DF$_3$, t-stat$_1$, t-stat$_2$, and t-stat$_3$, unless: DF$_1$>100, in which case DF$_1$ is set to 100; DF$_2$>100, in which case DF$_2$ is set to 100; DF$_3$>100, in which case DF$_3$ is set to 100; t-stat$_1$>20, in which case t-stat$_1$ is set to 20; tstat$_2$>20, in which case t-stat$_2$ is set to 20; t-stat$_3$>20, in which case t-stat$_3$ is set to 20; t-stat$_1$<0.01, in which case prob$_1$ is set to 0; t-stat$_2$<0.01, in which case prob$_2$ is set to 0; or t-stat$_3$<0.01, in which case prob$_3$ is set to 0.

44. The method of claim 41, wherein $$\text{cond\_performance\_score} = \left\{ \frac{[1-(.5+\text{or}-prob1)] + [1-(.5+\text{or}-prob2)] + [1-(.5+\text{or}-prob3)]}{3} \right\} * 100,$$

wherein for upward revisions prob$_1$ is subtracted from 0.5 if ave. return$_1$>0, else prob$_1$ is added to 0.5; wherein for upward revisions prob$_2$ is subtracted from 0.5 if ave. return$_2$>0, else prob$_2$ is added to 0.5; wherein for upward revisions prob$_3$ is subtracted from 0.5 if ave. return$_3$>0, else prob$_3$ is added to 0.5; wherein for downward revisions prob$_1$ is subtracted from 0.5 if ave. return$_1$<0, else prob$_1$ is added to 0.5; wherein for downward revisions prob$_2$ is subtracted from 0.5 if ave. return$_2$<0, else prob$_2$ is added to 0.5; and wherein for downward revisions prob$_3$ is subtracted from 0.5 if ave. return$_3$<0, else prob$_3$ is added to 0.5.

* * * * *